(12) United States Patent
Bryant

(10) Patent No.: US 11,454,446 B2
(45) Date of Patent: Sep. 27, 2022

(54) ANOMALY DETECTION AND NOTIFICATION OF ELECTRIC ARC FURNACE, SYSTEM AND METHOD

(71) Applicant: Billy Bryant, Rock Falls, IL (US)

(72) Inventor: Billy Bryant, Rock Falls, IL (US)

( * ) Notice: Subject to any disclaimer, the term of this patent is extended or adjusted under 35 U.S.C. 154(b) by 722 days.

(21) Appl. No.: 16/443,083

(22) Filed: Jun. 17, 2019

(65) Prior Publication Data

US 2020/0393199 A1 Dec. 17, 2020

(51) Int. Cl.
| | |
|---|---|
| *F27D 21/04* | (2006.01) |
| *G05B 19/05* | (2006.01) |
| *H05B 7/02* | (2006.01) |
| *F27D 11/08* | (2006.01) |
| *F27D 21/00* | (2006.01) |
| *H05B 7/20* | (2006.01) |

(52) U.S. Cl.
CPC .............. *F27D 21/04* (2013.01); *F27D 11/08* (2013.01); *F27D 21/00* (2013.01); *G05B 19/058* (2013.01); *H05B 7/02* (2013.01); *H05B 7/20* (2013.01); *G05B 2219/13167* (2013.01); *G05B 2219/14006* (2013.01)

(58) Field of Classification Search
CPC .............. F27D 11/08; H05B 7/02; H05B 7/20
USPC ........................................................ 373/102
See application file for complete search history.

(56) References Cited

U.S. PATENT DOCUMENTS

| | | | |
|---|---|---|---|
| 7,313,160 B1 | 12/2007 | Gerhan | |
| 7,991,039 B2 | 8/2011 | Gerhan et al. | |
| 10,051,694 B2 | 8/2018 | Bryant | |
| 10,190,821 B2 | 1/2019 | Bryant | |
| 2006/0114963 A1 | 6/2006 | Gerhan et al. | |
| 2013/0121365 A1* | 5/2013 | Ingersoll, III | F27B 3/28 373/102 |
| 2016/0105932 A1* | 4/2016 | Bryant | C21C 5/5211 373/106 |
| 2016/0131428 A1 | 5/2016 | Bryant | |
| 2020/0355436 A1* | 11/2020 | Toniolo | F27D 19/00 |
| 2020/0386648 A1* | 12/2020 | Luccini | F23M 5/08 |
| 2021/0150877 A1* | 5/2021 | Menzel | G08B 25/08 |

* cited by examiner

*Primary Examiner* — Md Azad
(74) *Attorney, Agent, or Firm* — Reinhart Boerner Van Deuren P.C.

(57) ABSTRACT

A method for identifying, classifying, and sending notification of an electric arc furnace's (EAF) anomalies to improve the EAF efficiency. The method includes the steps of establishing baseline state measurements of the EAF, receiving new state measurements of the EAF and statistically testing the new state measurements against the baseline state measurements. The method further includes the steps of identifying as an anomaly a failed statistical test, classifying the identified anomaly and sending notification of the classified anomaly to a configurable list of recipients.

39 Claims, 16 Drawing Sheets

ANOMALY DETECTION AND NOTIFICATION OF ELECTRIC ARC FURNACE, SYSTEM AND METHOD

FIELD OF THE INVENTION

This invention generally relates to electric arc furnaces, systems and methods.

BACKGROUND OF THE INVENTION

The basic operation of an Electric Arc Furnace (EAF) is well known and described as in, for example my disclosure in U.S. Pat. No. 10,051,694 (the '694 patent) titled, "Method and apparatus for dynamic selection of arc-furnace set-points," the entire teachings of which are incorporated herein by reference.

The '694 patent describes a typical electric arc furnace (EAF). An EAF is a furnace that heats material by way of an electric arc. Arc furnaces range in size from small units of approximately one ton capacity for secondary steelmaking up to about 400 ton units used for primary steelmaking. On a much smaller scale arc furnaces for use in research laboratories and by dentists, for example, have a capacity of tens of grams. Industrial electric arc furnace temperatures can typically be up to 1,800° C., and laboratory units can exceed 3,000° C.

Arc furnaces directly expose material to an electric arc, and the current in the furnace electrodes pass through the material. An EAF generally includes a refractory-lined vessel covered with a retractable roof, through which one or more graphite electrodes enter the furnace. The EAF is primarily split into three sections: the shell, which consists of the sidewalls and lower steel "bowl"; the hearth, which is the refractory layer that lines the lower bowl; and the roof, which may be refractory-lined and/or water-cooled, and can be shaped as a section of a sphere, or as a conical section. The roof also supports the refractory through which the graphite electrodes enter.

A typical alternating current (AC) EAF is powered by a three-phase electrical supply having three electrodes that enter through the roof. Electrodes are typically round in cross-section, and are arranged in segments with threaded couplings, so that as the electrodes wear, new segments can be added. The arc forms between the material in the EAF and the electrode. The material is heated both by current passing through the material and by the radiant energy from the arc. The electrodes are raised and lowered by a positioning system, which may use either electric winches or hydraulic cylinders. The regulating system maintains approximately constant current and power input during the melting of the material, even though scrap may move under the electrodes as it melts. The mast arms holding the electrodes can be coupled with busbars to carry the electrical current or the mast arms may be "hot arms", where the whole arm carries the current. Hot arms may consist of copper-clad steel or aluminum. The mast arms and electrodes move up and down for regulation of the arc, and are raised to allow removal of the furnace roof The EAF is often coupled to a tilting platform so that the liquid steel can be poured therefrom. A typical EAF could have a transformer rated about 100,000,000 volt-amperes (100 MVA), with a secondary voltage between 500 and 1300 volts and a secondary current in excess of 60,000 amperes. Such a furnace would be expected to produce a quantity of 100 tons of liquid steel in approximately 30 minutes from charging the EAF with cold scrap to tapping the furnace. In comparison, basic oxygen furnaces can have a capacity of 150-300 tons per batch, or "heat", and can produce a heat in 30-40 minutes.

The process to melt the steel includes the lowering of the electrodes onto the scrap, causing an arc to be struck and the electrodes are then set to "bore" into the layer of scrap at the top of the furnace. Typically lower voltages are selected for this first part of the operation to protect the roof and walls from excessive heat and damage from the arcs. Once the electrodes have reached the heavy melt at the base of the furnace and the arcs are shielded by the scrap, the voltage is increased and the electrodes raised slightly, lengthening the arcs and increasing power to the melt. This enables a molten pool to form more rapidly, reducing tap-to-tap times.

EAF performance is time varying. Time variance of the performance can be attributed to variations in scrap, utility power system fluctuations, variations in chemical energy systems, variations in operational practices, mechanical degradation, seasonal weather variation, and hydraulic system degradation. Those skilled in the art will recognize this is not an exhaustive list of the many possible variables effecting an EAF's performance at any given time.

EAFs utilize electrical and chemical energy sources to recycle scrap metal into steel. The electrical and chemical energy sources are controlled and varied throughout the melting process typically via controllers in order to match energy input to melting conditions so as to obtain more efficient operation. The controllers are typically configured with set-points/inputs which provide the necessary control to the various elements which make up an EAF. For example, a controller may signal the current and voltage to be provided to the electrodes and provide a signal to a servo valve to control the raising or lowering of the electrodes to achieve the current and voltage. Typical EAF set-points are known to those skilled in the art and are generally described in the '694 patent. For example, EAF controllers are typically configured with a set of set-points as shown in table 1.

TABLE 1

| Typical EAF Control Configuration | |
|---|---|
| Limit | Set-Point |
| Limit 1 | Set-point 1 |
| Limit 2 | Set-point 2 |
| . . . | . . . |
| Limit n | Set-point n |

Limits are time based and typically configured as electrical energy per ton of charged scrap (KWH/Ton) but sometimes are configured as electrical energy only (KWH), some combination of equivalent energy (electrical KWH plus converted chemical KWH/Ton) or even time.

As further described in the '694 patent, EAF set-point configuration can take several forms and depends on the particular controller. Configuration of set-points in terms of EAF current is very common; however, other electrical parameters such as impedance, admittance, arc length, arc resistance and voltage can also be used.

TABLE 2

Alternative EAF Control Configuration

| Limit | Set-Point Minimum | Set-Point Maximum |
| --- | --- | --- |
| Limit 1 | Set-Point 1 Minimum | Set-Point 2 Maximum |
| Limit 2 | Set-point 2 Minimum | Set-point 2 Maximum |
| ... | ... | ... |
| Limit n | Set-point n Minimum | Set-point 2 Maximum |

The electrical and chemical energy set-points are grouped into a schedule commonly referred to as a control profile. Control profiles can be a single static set-point (a single row in TABLE 1 for example) or a complex combination of static and dynamic set-points that are continuously varied between ranges based on process conditions (as detailed in TABLE 2). The industry trend has been toward control systems utilizing more dynamic controls that are based on real time measurements of process conditions.

EAF control systems are capable of being configured with multiple control profiles. Multiple control profiles provide operational flexibility in terms of production rate and efficiency, but cause problems when the wrong profile is executed.

Further problems may arise with EAF equipment because it is subjected to harsh conditions including heat, cold, vibration, enormous magnetic fields, high voltage and high current. Equipment degradation is continuously occurring at a non-linear unpredictable rate.

Excursions from nominal EAF operation due to the inherent EAF process variance, the trend toward dynamic control and the difficult operating environment are difficult to impossible to detect through state of the art management practices.

Typically, EAF performance and efficiency is measured using key performance indicators (KPIs). By way of non-limiting examples, some common EAF KPIs are power on time per heat (batch), power off time per heat, average current per heat, average voltage per heat, voltage variance per heat, average current squared time ($I^2t$) per heat, average three phase total power per heat, average resistance per heat, average reactance per heat, average mast asymmetry per heat, average voltage unbalance per heat, average zero sequence voltage per heat, pounds of graphite electrode consumed per ton of steel produced (electrode per ton), electrical energy per ton of steel produced (KWH/Ton), tons of steel produced per hour of operation (tons/hour), average electrical stability per heat (harmonic distortion of current and/or voltage, distortion power ratio), average error of electrical regulation per heat, average hydraulic valve spool position, standard deviation of hydraulic pressure, average hydraulic pressure, average tons of scrap material charged, average liquid tons produced to scrap yield and average cast tons produced to scrap yield.

The '694 patent discloses a control system for adjusting controller set-points to improve EAF efficiency. The control system therein is in control of the set of mast hydraulics of the electric arc furnace. The control system receives information from the current transformer relative to current being supplied to the EAF and from the voltage transformer relative to voltage being applied to the electric arc furnace. The control system has a memory containing a set of set-points for the control of the set of mast hydraulics, the voltage and the current of the EAF. A set-point modifier is in communication with the control system and evaluates the performance indicators of at least one previous heat of the EAF. The performance indicators include electrode consumption. After evaluation of the performance indicators, the set-points are altered by the set-point modifier to optimize the performance of the EAF.

Another effort to improve EAF performance is disclosed in U.S. Pat. No. 7,313,160 (the '160 patent). Therein is disclosed an improvement over EAF systems that monitor electrode current and produce a regulator signal based thereon. The regulator signal is sent to a hydraulic valve to alter the hydraulic spool valve to change the electrode mast position which in turn alters the current flow in the electrodes which is monitored by the regulation system. The process is repeated until another change in the electrode currents requires adjustment.

While the '160 patent improved on detection of suboptimal regulation system performance, it is only applicable to detection of suboptimal EAF performance in a very limited set of circumstances due to the limitations of the inputs, that is, historical measurements of electrode current, regulator signal, hydraulic valve spool position, hydraulic fluid pressure, electrode mast position.

Yet another effort to improve EAF performance is disclosed in the U.S. Pat. No. 7,991,039 (the '039 patent). Therein is disclosed a system for monitoring an electric arc furnace including an onsite system monitoring device connected to an onsite furnace monitoring viewer system and communicably connected to a local server. The local server is in turn communicably connected to a remote server and data base. The onsite system includes a metering device for collecting data about the primary electrical system. Programmable logic controllers provide process data from each heat such as times, oxygen, natural gas consumption, process weights, temperatures and end-of-heat signals. The furnace monitoring system server combines electrical data from the metering device, process information from the PLCs and manually entered data into a comprehensive data, acquisition, storage, and retrieval system. This data is sent to an offsite remote database. A furnace operator can access the remote database to generate heat analysis reports and other limited analysis. The local furnace monitoring viewer system allows a local operator to simultaneously view real time data and historical performance data.

Unfortunately the '039 patent relies on detection of EAF anomalies through casual state of the art observation and reaction to negatively trending KPIs, resulting in suboptimal EAF performance and efficiency. Therefore, the '039 patent does not provide the required degree of improvement in system performance and efficiency.

Indeed, many EAF production facilities lack the resources to identify and perform adequate root cause analysis of control system anomalies in particular. Facilities rely on infrequent equipment inspections by control systems vendors for detection of control system anomalies. The root cause of an EAF process or control system failure often go undetected in current EAF systems.

Thus, in the current state of the art, EAF process, equipment or control system anomalies are typically detected when one or more of the key process indicators (KPIs) have been negatively impacted for some prolonged period of time (days to weeks). Some KPIs such as electrode per ton are only updated monthly by most facilities. Unfortunately, significant additional operational cost has already been incurred when an EAF anomaly is detected through a negatively trending KPI. As such, the current state of the art does not provide the desired EAF efficiencies and reliability.

BRIEF SUMMARY OF THE INVENTION

Embodiments of the invention provide for a technological advance over existing EAF's, EAF systems, and EAF methods with timely, accurate detection and failure classification of EAF process or control anomalies with automated continuous measurement and statistical analysis of the process and classification of the anomaly, including logic testing of continuous parameters, heretofore unknown in EAF systems and methods.

Embodiments of the invention improve on the state of the art by continuous, automatic measurement and statistical testing of EAF process parameters. Known good measurements or statistical values of range, central tendency and dispersion are stored and used to test new measurements. EAF process parameters of interest are continuously monitored, recorded and tested for anomalies. Any test failures result in classification of the anomaly and immediate notification to a configurable list of recipients which may include an email address of a person having an interest in the EAF such as an operator of the EAF.

In one aspect, an embodiment, the invention provides a method for identifying, classifying, and sending notification of anomalies of an electric arc furnace (EAF) to improve the EAF efficiency and reliability of the EAF. The method includes the steps of establishing baseline state measurements of the EAF and receiving new state measurements of the EAF. The method includes the steps of statistically testing the new state measurements against the baseline state measurements, identifying as an anomaly a failed statistical test and classifying the identified anomaly. The method includes the step of sending notification of the classified anomaly to a configurable list of recipients.

In an embodiment, the baseline state measurements and the new state measurements are at least a one of an electrical system measurement, a mechanical system measurement and an EAF process system measurement.

In an embodiment, the electrical system measurement is one of per-phase current, voltage, impedance, admittance, resistance, reactance, power factor, real energy, real power, reactive power, apparent power, symmetric components of voltage, symmetric components of current, frequency, harmonic distortion of current, harmonic distortion of voltage, and distortion power factor.

In an embodiment, the mechanical system measurement is one of electrode mast hydraulic pressure, hydraulic valve spool position, electrode mast position, regulation system output value, shell and roof cooling water temperatures, transformer water temperature, transformer oil temperature, utility transformer tap position, EAF transformer tap position, reactor tap position, reactor bypass breaker state, oxy/fuel burner gas flow rate, oxy/fuel burner oxygen flow rate, carbon injector carbon flow rate and lime injector lime flow rate.

In an embodiment, the EAF process system measurement is one of charge number, weight of charged material, weight of tapped steel, power on time, power off time, steel temperature, steel carbon content, steel oxygen content and slag composition.

In an embodiment, the step of statistically testing the baseline state measurements against the new state measurements is done by a local PC.

In an embodiment, the step of statistically testing the baseline state measurements against the new state measurements is done by a remote server.

In an embodiment, the step of establishing baseline state measurements includes the step of taking state measurements at a fixed rate.

In an embodiment, the step of establishing the baseline state measurements includes the step of grouping state measurements together over a measurement aggregation period (MAP). The MAP is determined by at least one of a heat, charge, number of samples, and a fixed time interval.

In an embodiment, the step of grouping state measurements together over a MAP includes the step of establishing a baseline MAP to establish the baseline state measurements. The step further includes closing the baseline MAP file and storing the baseline MAP file in one of or both of an onsite PC and remote storage.

In an embodiment, the step of storing the baseline MAP includes the step of including a baseline control profile identifier for the baseline MAP.

In an embodiment, the step of obtaining new state measurements is based upon the MAP, each new MAP stored in one or both of the local PC and a remote storage.

In an embodiment, the step of storing the new MAP includes the step of storing a new control profile identifier with the new MAP In an embodiment, the step of identifying as an anomaly a failed statistical test includes the step of identifying as an anomaly a failure to receive new state measurements over a predetermined time.

In an embodiment, the statistical test is based upon a selected one of the new state measurements.

In an embodiment, the step of classifying includes the step of quantifying the units of the identified anomaly. The step further includes quantifying the test limits for a parameter of the anomaly, and the amount of time the parameter exceeded the test limits.

In an embodiment, the selected one of the new state measurements may be one of a continuous parameter, a discrete parameter, and a differential parameter.

In an embodiment, the statistical testing of the continuous parameter includes the steps of dividing the baseline state measurements and new state measurements of the continuous parameter into baseline bins and new measurement bins according to a time base. The statistical testing includes comparing each of the new measurement bin statistics of the continuous parameter to the baseline bin statistics of the continuous parameter. The statistical test fails where the new measurement bin statistics of the continuous parameter exceed limits of the baseline bin statistics.

In an embodiment, the time base is one of or a combination of heat time, charge time, heat energy, charge energy, heat energy per heat ton, charge energy per charge ton.

In an embodiment, the step of selecting the continuous parameter includes the step of selecting the continuous parameter from one of an EAF current, EAF voltage, EAF impedance, EAF admittance, EAF resistance, EAF reactance, EAF real power, EAF reactive power, EAF apparent power, EAF power factor, EAF regulation error, EAF regulator set point, EAF transformer tap position, series reactor tap position, series reactor bypass breaker state, utility transformer tap position, regulation output, oxy-fuel burner gas flow rate, oxy-fuel burner oxygen flow rate, carbon injection carbon flow rate and lime injection lime flow rate.

In an embodiment, the statistical testing of the continuous parameter includes the step of testing continuous parameters by continuous quantification of time at, above or below a predetermined limit per one of a heat, charge, number of samples, and a fixed time interval.

In an embodiment, the step of classifying the anomaly includes the step of performing logic testing based on the failed statistical test. The logic test including the step of comparing at least one of the failed statistical tests to an indicator.

In an embodiment, the indicator is a one of, variation in EAF regulator output, no variation in regulator output, percent of time regulator output is varying greater than a minimum limit, low hydraulic pressure, a measured transformer tap position statistical distribution different than a baseline state statistical distribution, a measured reactor tap position statistical distribution different than the baseline state statistical distribution, regulation system percent error greater than a selected limit, a measured set-point statistical distribution different than a baseline state set-point statistical distribution, a ratio of changing measured hydraulic pressure to a baseline hydraulic pressure greater than a selected limit for an entire MAP, a ratio of variance of measured hydraulic pressure to a baseline hydraulic pressure greater than a selected limit and for a partial MAP, a ratio of variance of a measured hydraulic pressure to a baseline hydraulic pressure greater than a selected limit, a ratio of variance of measured voltage to baseline voltage greater than a selected limit, a ratio of variance of measured current to baseline current greater than a selected limit, a measured set-point statistical distribution equivalent to a baseline set point statistical distribution.

In an embodiment, the discrete parameter is a constant central tendency parameter. The statistical testing of the constant central tendency parameter includes the steps of establishing the baseline measurements of the constant central tendency parameter over a measurement aggregation period (MAP), the MAP determined by a first heat. The statistical testing of the constant central tendency includes calculating a baseline central tendency of the baseline measurements of the constant central tendency parameter, calculating a dispersion parameter of the baseline measurements of the constant central tendency parameter and calculating from the new measurements of the constant central tendency parameter a new central tendency of the constant central tendency parameter for a new heat. The statistical test fails when the baseline central tendency of the new heat exceeds the baseline central tendency by a configured multiple of the dispersion parameter.

By way of non-limiting examples the discrete parameter may be transformer temperature, a heat current, a transmission voltage, per charge energy consumption, discrete parameters of the EAF hydraulic system and chemical energy systems.

In an embodiment, the discrete parameter is a constant central tendency parameter. The statistical testing of the constant central tendency parameter includes the steps of calculating a central tendency of the constant central tendency parameter from the new measurements of the constant central tendency parameter over measurement aggregation period (MAP), the MAP determined by a one of a heat, charge, sample, and period of time. The statistical testing includes, comparing the calculated central tendency to a constant value. The statistical test fails when the calculated central tendency exceeds the constant value.

In an embodiment, the notification is sent to at least one of a PC, a server, a controller, a PLC, and a display.

In an embodiment, the statistical testing of the differential parameter includes the steps of selecting as the differential parameter to be statistically tested a differential parameter of a MAP of a one of a heat, charge, number of samples or period of time, that maintains a limited rate of change from a MAP to a next one of the MAPs. The statistical testing includes establishing the baseline measurements of the discrete parameter from a selected number of the heats. The statistical testing includes, calculating a baseline central tendency of the heat to heat difference of the baseline measurements of the discrete parameter and calculating a baseline dispersion of the heat to heat difference of the baseline measurements of the discrete parameter. The statistical testing includes calculating the difference between the new measurements of the discrete parameter from a new heat and the baseline measurements of the discrete parameter. The statistical test fails when the calculated difference exceeds the baseline central tendency by a configured multiple of the calculated baseline dispersion.

In an embodiment, the statistical testing of the differential parameter includes the steps of selecting as the differential parameter to be statistically tested a differential parameter of a MAP of a one of a heat, charge, number of samples or period of time, that maintains a limited rate of change from a MAP to a next one of the MAPs. The statistical testing includes calculating the difference between the measurements of the discrete parameter from new measurements of the discrete parameter from the next one of the heats and the measurements of the discrete parameter of the first heat. The statistical test fails when the calculated difference exceeds a constant value.

In an embodiment, the statistical test results are stored in a PC data base.

In an embodiment, the statistical test results are stored in a remote database.

In an embodiment, the step of classifying any failed statistical test includes the step of classifying a failure to receive a one of the new measurements over a predetermined time and notifying the user of the failure to receive the measurement.

In an embodiment, a non-transitory computer readable medium includes programming instructions configured to perform the method for identifying, classifying, and sending notification of anomalies of an electric arc furnace (EAF) to improve the EAF efficiency and reliability of the EAF. The method includes the steps of establishing baseline state measurements of the EAF and receiving new state measurements of the EAF. The method includes the steps of statistically testing the new state measurements against the baseline state measurements, identifying as an anomaly a failed statistical test and classifying the identified anomaly. The method includes the step of sending notification of the classified anomaly to a configurable list of recipients.

In an embodiment, the efficiency is measured by a key performance indicator.

In an embodiment, the method includes the step of storing in delimited text files, the baseline state measurements and the new state measurements and making the delimited text files accessible on an Ethernet network.

In an embodiment, the configurable list of recipients are email addresses.

In another aspect, an embodiment of the invention provides a system for continuous monitoring an Electric Arc Furnace (EAF) to identify and classify EAF anomalies to improve the EAF efficiency. The system includes a device configured to receive and establish baseline state measurements of the EAF. The device is configured to receive new state measurements of the EAF, perform statistical testing of the baseline state measurements against the new state measurements, identify as an anomaly a failed statistical test and classify the identified anomaly. The device is configured to notify a configurable list of recipients of the classification.

In an embodiment, the device is a personal computer (PC).

In an embodiment, the system includes at least a first electrical metering device communicably coupled to a power system of the EAF. The system includes an EAF process and control system for monitoring and controlling the EAF. The system includes at least a first programmable logic controllers (PLC) communicably coupled to the EAF process and control system. The PC is communicably coupled to the first electrical metering device and the PLC for at least receiving measurements therefrom.

In an embodiment, the device is a remote server.

In an embodiment, the system includes a remote storage service configured to receive the EAF state measurements from a PC and to provide the EAF state measurements to the remote server. The system includes a remote data base. The remote database is configured to receive from the remote server, store, and allow the remote server to access the statistical test results and the identified and classified anomalies.

In yet another aspect, an embodiment of the invention provides an electric arc furnace (EAF). The EAF includes a refractory-lined vessel covered with a retractable roof through which one or more graphite electrodes enter the EAF. The EAF includes a power system, powering the EAF. The EAF includes at least a first electrical metering device communicably coupled to the power system. The EAF includes an EAF process and control system measuring and controlling the EAF and at least a first programmable logic controller (PLC) communicably coupled to the EAF process and control system. The EAF includes a computing device. The computing device is communicably coupled to the first electrical metering device and the PLC. The computing device is configured to receive and establish baseline state measurements of the EAF. The computing device is configured to receive new state measurements of the EAF and perform statistical testing of the baseline state measurements against the new state measurements. The computing device is configured to identify as an anomaly a failed statistical test and to classify the identified anomaly. The computing device is configured to send notification of the classified anomaly to a configurable list of recipients.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
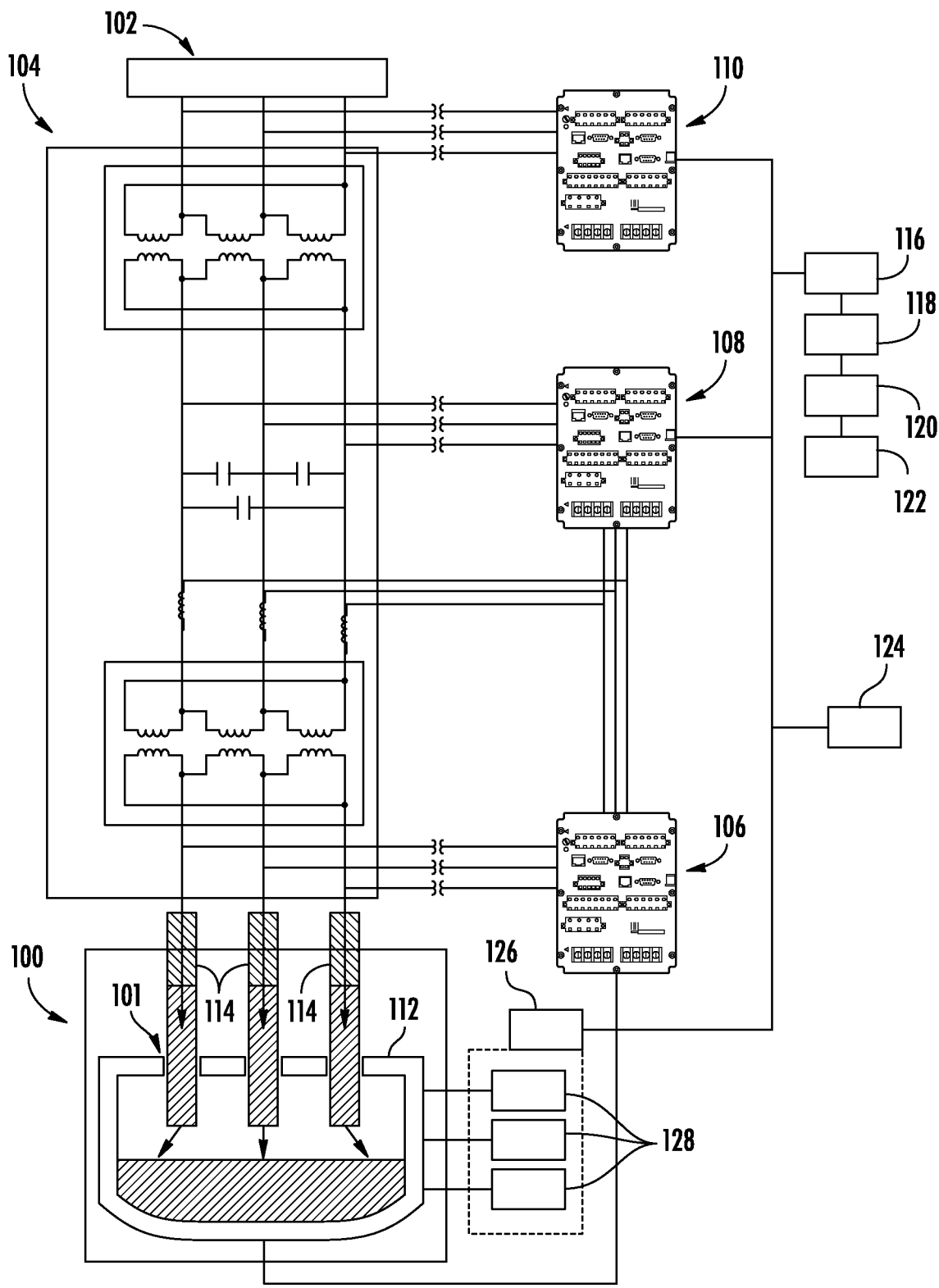
FIG. 1 is a schematic representation of an Electric Arc Furnace according to the teachings of the instant invention.

Turning now to the drawings, there is illustrated in FIG. 1 an exemplary embodiment of an Electric Arc Furnace (EAF) 100. While such an exemplary embodiment will be utilized in describing various features and advantages of embodiments of the invention, such a description should be taken by way of example and not by limitation. Indeed, advantages of embodiments of the invention can be used to improve a variety of EAFs and EAF systems and methods where it is desirable to monitor an EAF for optimum performance by identifying, classifying and notifying a user of anomalies so as to improve the performance of the EAF. For example, while FIG. 1 depicts an EAF powered by alternating current, that is an AC EAF, those skilled in the art, after reading the full disclosure herein will readily recognize the teachings herein are readily applicable to a direct current (DC) EAF.

The EAF 100 is configured to continuously monitor the state of the EAF 100 and identify, classify and notify a user of anomalies in the EAF 100. Once the user is notified the anomalies then the EAF 100 can be fixed, adjusted or controlled as necessary to improve its efficiency.

The EAF 100 receives from a utility transmission system 102 three phase power to an EAF power system 104 of the EAF. The EAF power system 104 is a three phase power system which allows for electrical measurements of the EAF 100 which may be monitored.

By way of non-limiting examples, some common EAF electrical system measurements are per-phase current, voltage, impedance, admittance, resistance, reactance, power factor, real energy, real power, reactive power, apparent power, symmetric components of voltage, symmetric components of current, frequency, harmonic distortion of current, harmonic distortion of voltage, and distortion power factor. The EAF 100 electrical system measurements are taken at the EAF secondary or low voltage location by a first meter 106, the EAF primary location by a second meter 108, and the high voltage location at a third meter 110.

In addition to electrical measurements of the EAF 100, mechanical measurements may be made and monitored. By way of non-limiting examples, some common EAF 100 mechanical system measurements are electrode mast hydraulic pressure, hydraulic valve spool position, electrode mast position, regulation system output value, shell and roof cooling water temperatures, transformer water and oil temperatures, utility transformer tap position, EAF transformer tap position, reactor tap position, reactor bypass breaker state, oxy/fuel burner gas flow rate, oxy/fuel burner oxygen flow rate, carbon injector carbon flow rate and lime injector lime flow rate.

In addition to the electrical and mechanical measurements, process measurements of the EAF 100 may be made and monitored. By way of non-limiting examples, some common EAF 100 process measurements are charge number, weight of charged material, weight of tapped steel, power on time per heat, power off time per heat, steel temperature, steel carbon content, steel oxygen content and slag composition.

The combination of EAF electrical system measurements, mechanical system measurements and process measurements at an instantaneous point in time are collectively referred to as EAF 100 state measurements or measurements of the EAF 100 state.

The EAF 100 is a refractory-lined vessel covered with a retractable roof 112, through which one or more graphite electrodes 114 enter the EAF 100. The EAF 100 includes a computing device 116, which may be a personal computer (PC) 116 with executing system software. By executing system software it is meant common business and engineering software capable of reading text files. By way of non-limiting examples some common business and engineering software are MS Office, Matlab, Rstudio. Heretofore, the state of the art has not utilized common business and engineering software directly, utilizing instead proprietary binary formats requiring specialized software provided by the vendor to process or convert to a format useable by common business and engineering software. Still other systems do not store measurements of an EAF state due to constraints imposed by the choice of hardware and/or lack of a PC operating system.

While the PC 116 is described, it is not the intent to limit the embodiment to only the PC 116, as in other embodiments, a computing device with executing software, processing and memory can be used. Some non-limiting examples are a server, controller, processor, a MAC device, or a mobile device. The PC 116 includes local storage 118, a processor 120, and a local database 122. The PC 116 is communicably connected to one or more programmable logic controllers (PLC) 124 and one or more of the electrical metering devices 106, 108, 110. By communicably coupled it is meant that, the sensed EAF state measurements of the EAF power system 104 from the metering devices 106, 108, 110 are able to be transmitted and received as electronic data between the PLC 124 and the metering devices 106, 108, 110. The communication may be wired or wireless communication.

The PLC 124 communicates to the PC 116 EAF state measurements from an EAF process and control system 126. The EAF process and control system 126 includes a plurality of controllers 128 which receive sensed EAF state measurements from the EAF and provide set points for the desired EAF state parameter. For example, a servo valve (not illustrated) of the EAF 100 operates to control hydraulic pressure to raise and lower the graphite electrodes 114. Thus, an EAF state parameter is mast position, while another is hydraulic pressure. A one or more of the controllers 128 may be dedicated to provide the set points (and/or control profile) for the servo valve to control the mast height and the hydraulic fluid flow. Meanwhile, the actual mast height and hydraulic pressure may be sensed at the EAF 100 and communicated to the controller 128 which in turn communicates the information to the PLC 124 and then to the PC 116.

A user can see the measured parameter at a display, at the controller 128, for example, although as readily understood by those in the art, the display can be at any location, and then if desired adjust the control profile and set points to optimize EAF efficiency.

Additional, non-limiting examples of other EAF state parameters are, EAF series reactor tap position, EAF transformer tap position, EAF series reactor bypass breaker state, utility transformer tap position, EAF electrode regulation set-point, a heat's power on time, oxygen flow rates, natural gas flow rates, charged scrap weights, temperatures and end-of-heat signals.

EAF state parameters may be categorized in a statistical sense as continuous parameters, discrete parameters and differential parameters.

Continuous EAF state parameters are time varying, continuously changing throughout a heat and are significant on a per-sample basis. Some non-limiting examples of continuous parameters are EAF current, EAF voltage, EAF impedance, EAF admittance, EAF resistance, EAF reactance, EAF real power, EAF reactive power, EAF apparent power, EAF power factor, EAF regulation error, EAF transformer tap position, series reactor tap position, utility transformer tap position, regulation set-point, oxy-fuel burner gas flow rate, oxy-fuel burner oxygen flow rate, carbon injection carbon flow rate and lime injection lime flow rate.

Figure 2:
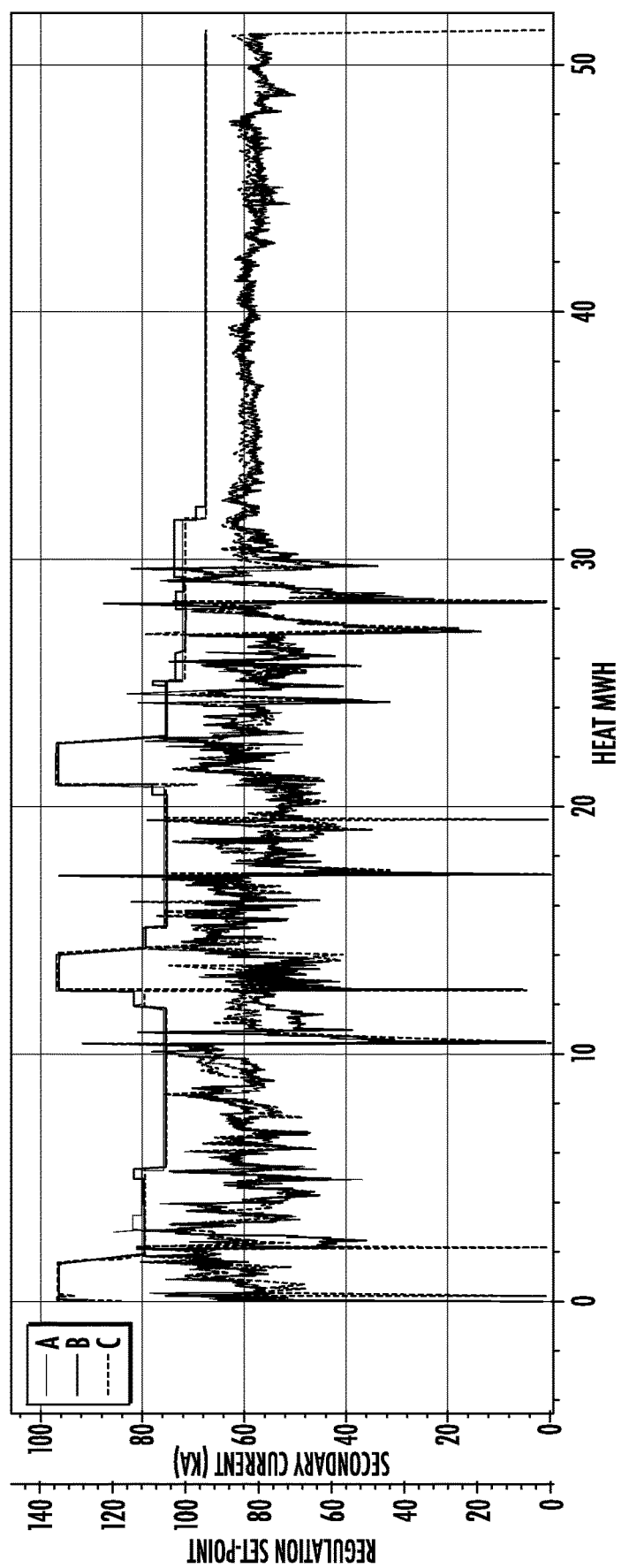
FIG. 2 is an example of EAF secondary current samples.

FIG. 2 provides an example of EAF secondary current and regulation admittance set-points per phase sampled throughout a single batch (heat) composed of three scrap charging cycles. The magnitude and variance of current is time-varying with respect to melting progress (Heat MWH), and the regulation admittance set-points are time-varying, non-deterministic and unbalanced at times. The EAF regulation control profile in this example is similar to the case of previously discussed Table 2.

Figure 3:
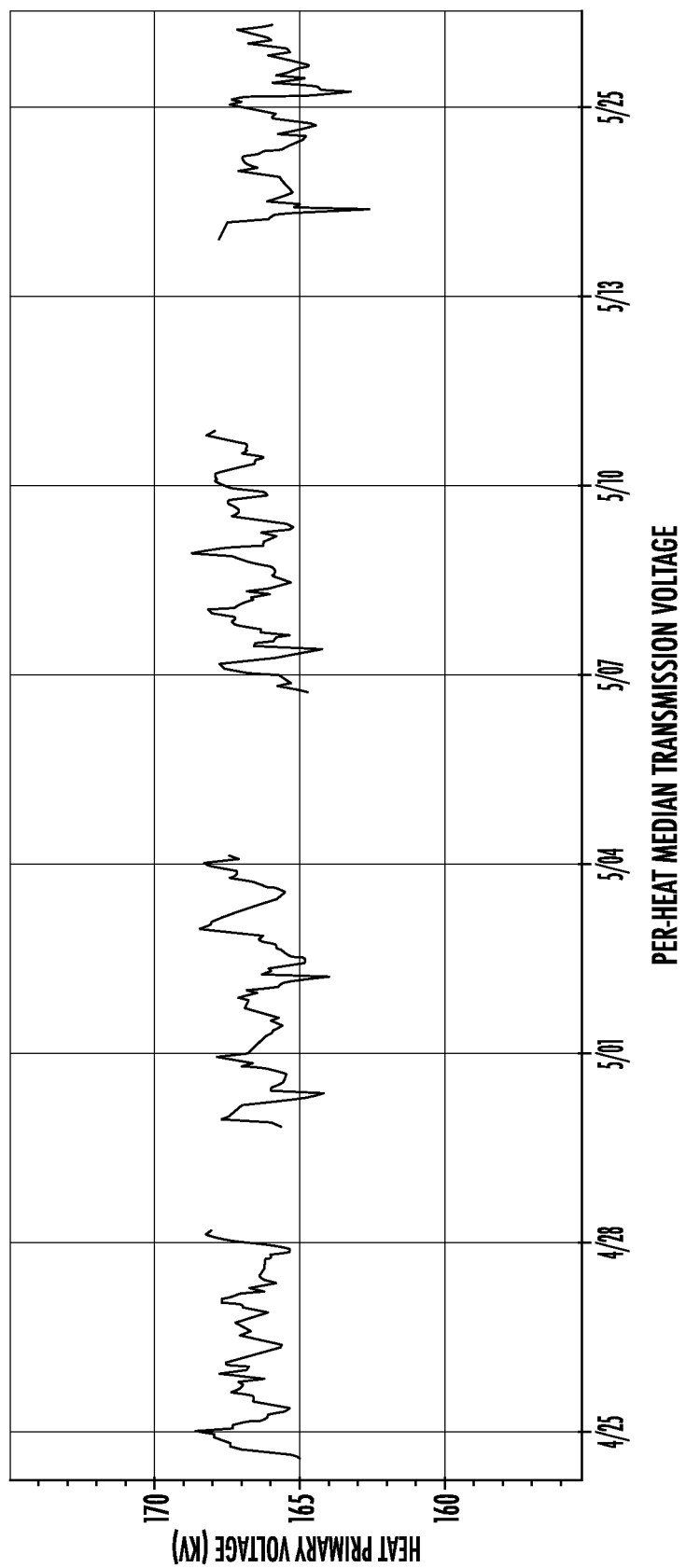
FIG. 3 is an example of EAF per heat median transmission voltage.

A discrete parameter is slowly time varying and the statistics of the parameter are significant on a per heat or per charge basis. Examples of discrete parameters are electrical energy consumption, maximum transformer temperature, EAF primary voltage and EAF transmission voltage. FIG. 3 provides an example of EAF per heat median transmission voltage over a span of several weeks. The parameter (median transmission voltage) varies per heat.

Figure 4:
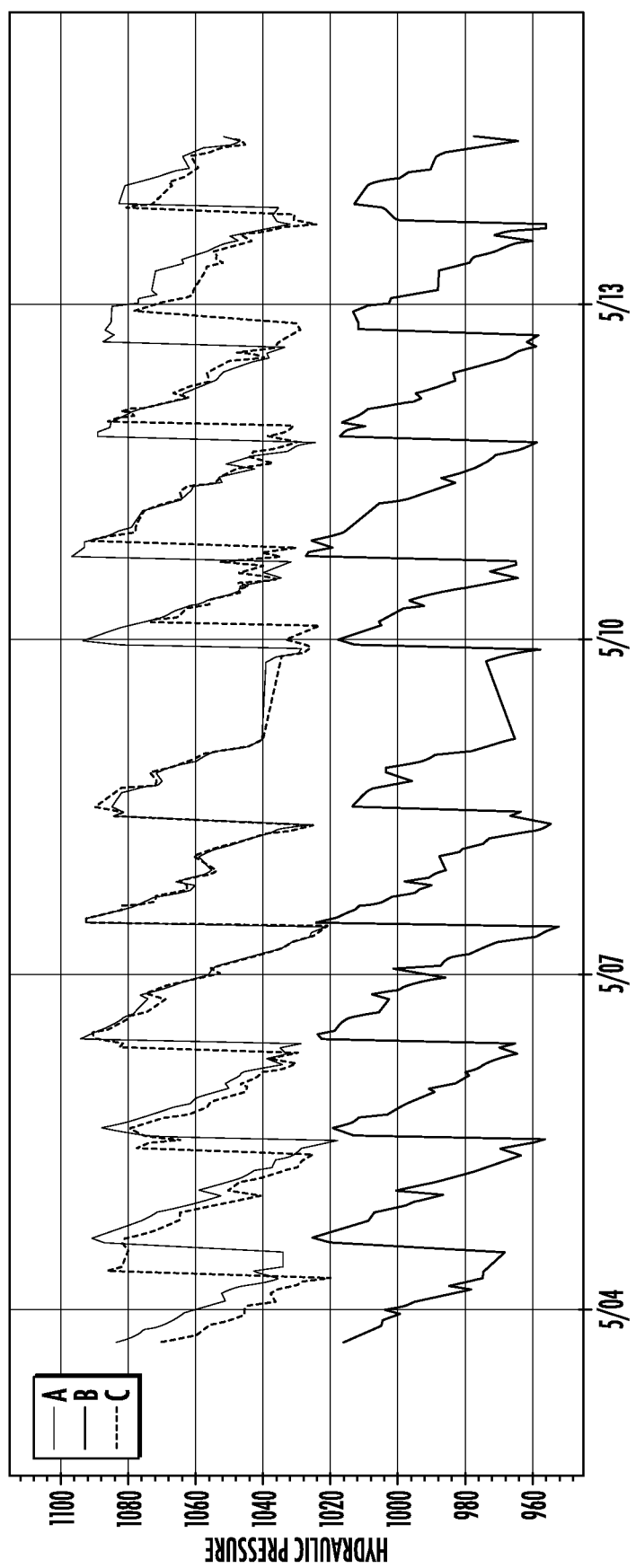
FIG. 4 is an example of per-phase median hydraulic pressure per heat.

A differential parameter is slowly time varying and the statistics of the heat to heat difference, or charge to charge difference are significant. An example of a differential parameter is EAF mast hydraulic pressure. FIG. 4 provides an example of per-phase median hydraulic pressure per heat for a span of several heats. Note that the pressure generally decreases over time as the graphite electrode is consumed, reducing weight on the electrode mast hydraulic cylinder.

Figure 5:
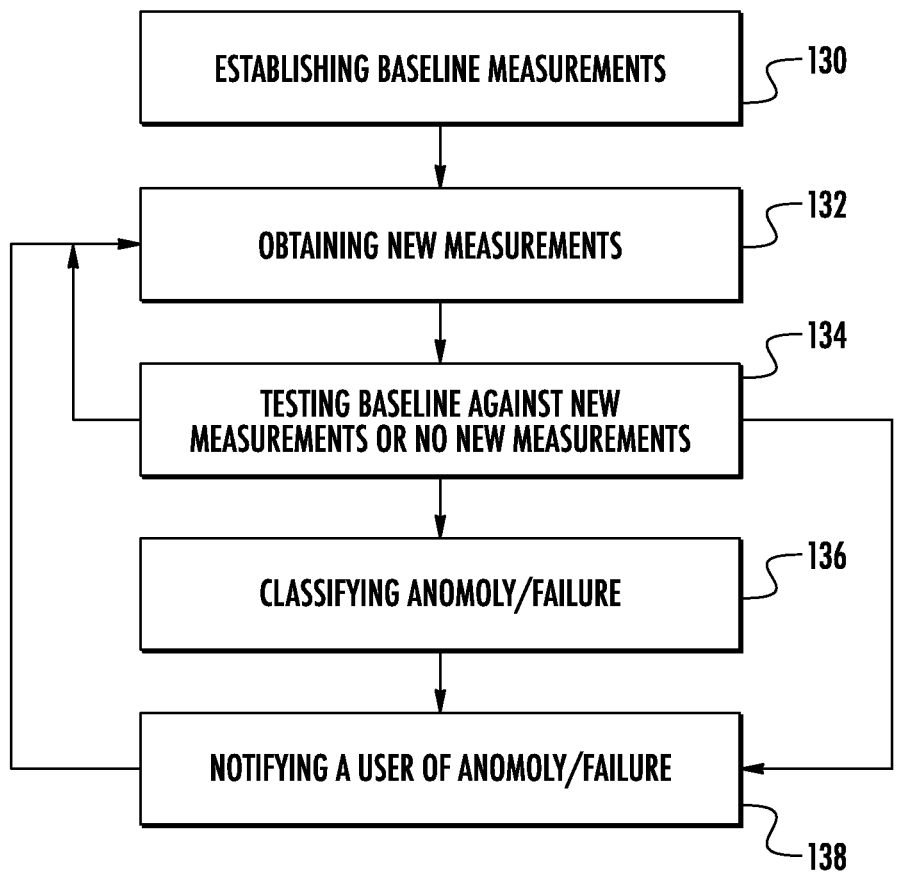
FIG. 5 is a schematic illustration of a method for monitoring EAF measurements and identifying, classifying and sending notification of EAF anomalies.

The PC 116 executes the method shown in the block diagram of FIG. 5 to identify, classify and notify a user of anomalies found in the EAF 100. However, it is not the intent to limit the steps of the method to the PC 116. For example the PC 116 could be configured to communicate and receive data from any device utilizing executing software to carry out the steps of the method, for example, a local server, a remote server, a processor, or a controller.

Block 130 comprises the steps of establishing baseline measurements of the desired EAF state parameters received from the electrical metering devices 110 and PLC 124. The baseline measurements represent nominal EAF process state and are used to compare all new measurements against. Baseline measurements are grouped together over a measurement aggregation period (MAP). A baseline's MAP is typically composed of several heats but can be defined by some other aggregation period.

The baseline is automatically created on startup of the EAF 100 and can be re-initialized at any time, a process referred to as rebaselining. In rebaselining, the existing EAF 100 baseline is deleted and EAF state measurements acquisition starts over. Rebaselining becomes necessary when intentional equipment, process or process control modifications are conducted that result in an intentional shift of a state parameter's statistics.

The baseline is composed of at least the following EAF state measurements of the following parameters: heat power on time, charge power on time, heat MWH, charge MWH, charge number, control profile identifier, per-phase current, per-phase voltage, per-phase real power, per-phase power factor, per-phase hydraulic pressure, per-phase regulator output signal, per-phase mast position, regulation set-point, charge weight, utility transformer tap, series reactor tap or series reactor bypass breaker state, EAF transformer tap, per-phase regulation error, oxy-fuel burner control system set-points, oxy-fuel burner flow rates, lime injection system control set-points, lime injection system flow rates, carbon injection system set-points and carbon injection system flow rates. Additional EAF state measurements of parameters can be added to the baseline as necessary to support testing and detection of anomalies unique to a particular EAF or facility.

Block 132 illustrates the method further comprises the step of obtaining new measurements by continually measuring the EAF state. The PC 116 continues to aggregate and transfer the new measurements to the local storage 118. The new measurements are collected into a file in the PC's storage 106 until the completion of the new measurement MAP. A MAP for new measurements typically corresponds to 1 heat, but can also be defined by a number of samples or a fixed time interval. Upon completion of the new measurements MAP, the file is closed and a new measurements file is created for the next MAP. The new MAPs are processed by the processor 120 at a fixed time interval (e.g. 15 minutes). Processed measurements are stored in the local database 110.

Completed measurements files are copied to the local storage 118 and made available to users of the EAF 100. The measurement files are stored in a file format suitable for use with common business and Engineering software capable of reading a text file (e.g. MS Office, Matlab, Rstudio). Heretofore, direct use of such common software has not been achieved. Other systems that make measurements available to users do so by providing files that are encoded in proprietary binary formats requiring specialized software provided by the vendor to process or to convert to a format usable by common business and Engineering software. Other systems do not store measurements of EAF state due to constraints imposed by the choice of hardware and/or lack of a PC operating system (e.g. PLC based).

As just discussed, the processor 120 checks for new measurements files in the local storage 118 at a fixed time interval. EAF production facilities are extreme environments and equipment failures are common as previously discussed. It is common for network hardware or connections to fail resulting in loss of communication with the PLC 124 or electrical metering device 114 and loss of new measurements. It is also normal for no new measurements to be received for some period of time due to scheduled facility maintenance downtime (e.g. 24-48 hours).

However, if no new measurements are available in the local storage 118, the processor 120 calculates the amount of time that has transpired since receiving new measurements. If the amount of time exceeds a configured limit (e.g. 48 hours), a notification is provided as seen at Block 138. Notification may be to a configurable list of recipients. By configurable list of recipients it is meant that notification can be an email to a person having an interest in the EAF 100 on site or off site or to a display at the EAF 100 or on any desired equipment of the EAF 100. The processor 120 continues to calculate the amount of time since receiving new state measurements and continues to provide notification at the configured interval until new state measurements are received.

However, if new measurements are being received, then after completion of the establishment of a baseline, as shown at Block 134, the processor 120 begins to perform statistical tests of the new measurements against the baseline measurements. As discussed, no testing of the state measurements takes place until the state measurements baseline is completed and stored in the local database 122. The testing step will be further explained after discussing the remainder of the method steps.

Block 136 illustrates the step of failure classification. Where the statistical test of a discrete parameter or differential parameter failed because the tests for the discrete and differential parameter tests are specific, i.e. they are performed in order to detect a specific issue, then logic testing is not performed as the classification is clear from the test performed. However, if a test failure occurs for a continuous parameter then a series of logic tests are performed to classify or assign a cause to the anomaly or failure.

Block 138 illustrates the further step of notifying a user of the anomaly indicated by the test failure. The method repeats to continue with its measurements and testing so as to continue to maximize the EAF's 100 reliability and efficiency.

Returning to Block 134, the testing step will be further discussed in greater detail. When the baseline's MAP is completed and new measurements become available, the processor 120 performs statistical comparisons of the new measurements and the baseline. The baseline is loaded into the processor 120 memory from the local database 122 and pre-processed as necessary depending on the statistical test to be performed. The baseline that is loaded corresponds to the control profile identifier in the new measurements, or a default if the control profile identifier is not specified in the measurements.

As shown in Tables 1 and 2 EAF regulation system control profiles are indexed using various time base metrics. The EAF regulation system controls the particular EAF subsystem (electrical energy via movement of the hydraulic masts, chemical energy via flow rates for natural gas, Oxygen, Carbon, etc.) by achieving and maintaining the set-point or set-point range for the profile step until the limiting index is reached and then continues to the next index and set-points. The index is referred to as a time based because the metric can be thought of as some function of time. For example: a profile step length of 10 MWH with an electrical real power level of 100 MW is approximately 10 MWH/100 MW=0.1 hours or 6 minutes.

Common time bases utilized are heat time (minutes), charge time (minutes), heat energy (mega-watt hours, MWH), charge energy (charge mega-watt hours, charge MWH), heat energy per heat ton (MWH/Ton) and charge energy per charge ton (Charge MWH/Charge Ton). There are also vendor specific dynamic time bases that utilize proprietary combinations of energy per heat or energy per charge ton that are non-linearly and non-deterministically translated between them.

FIG. 2 demonstrates the importance of consideration of the time base to detection and classification of EAF anomalies with respect to continuous parameters. If the time base (Heat MWH in this case) is not taken into account, a detection and classification algorithm is limited to statistics calculated per-heat (at best) which results in extremely limited time resolution of EAF state. For example, detection of an EAF regulation anomaly using the heat average regulation accuracy as opposed to a higher resolution time base such as 2.0 charge MWH groupings that approximate the configured regulation profile steps, enabling an anomaly to be identified at a particular step in the control profile. Indeed, the prior art failed to take this into consideration. Indeed, the '160 patent has limited time resolution due to its lack of consideration of time base.

The baseline pre-processing step calculates and ads a time base configured to match the index used by the EAF control system profile and performs general measurements filtering and scaling as necessary. The addition of the time base enables aggregation of the measurements into groups (bins) closely matching the steps of the particular control system profile. If a per charge time base is configured (charge time, charge MWH, charge KWH/Ton, etc.) the baseline measurements are aggregated into groups per charge in order to accommodate the per charge time base.

The specific statistical test performed depends on the type of EAF state parameter being tested, with parameters being generally classified as continuous, discrete, and differential.

A continuous parameter is time varying, continuously changing throughout a heat and is significant on a per-sample basis. A discrete parameter is slowly time varying and the statistics of the parameter are significant on a per heat or per charge basis. A differential parameter is slowly time varying and the heat to heat, or charge to charge difference of the parameter statistics are significant.

Parameters are further subdivided depending on the nominal statistical characteristics of the parameter. The following examples of testing methodologies provide an overview of the most common scenarios, but should not be interpreted as constraints. The testing framework is configurable on a per-facility, per-EAF, per-parameter basis. An EAF heat is used as the MAP in the following examples, however the MAP can be an alternative time period as previously described.

Figure 6:
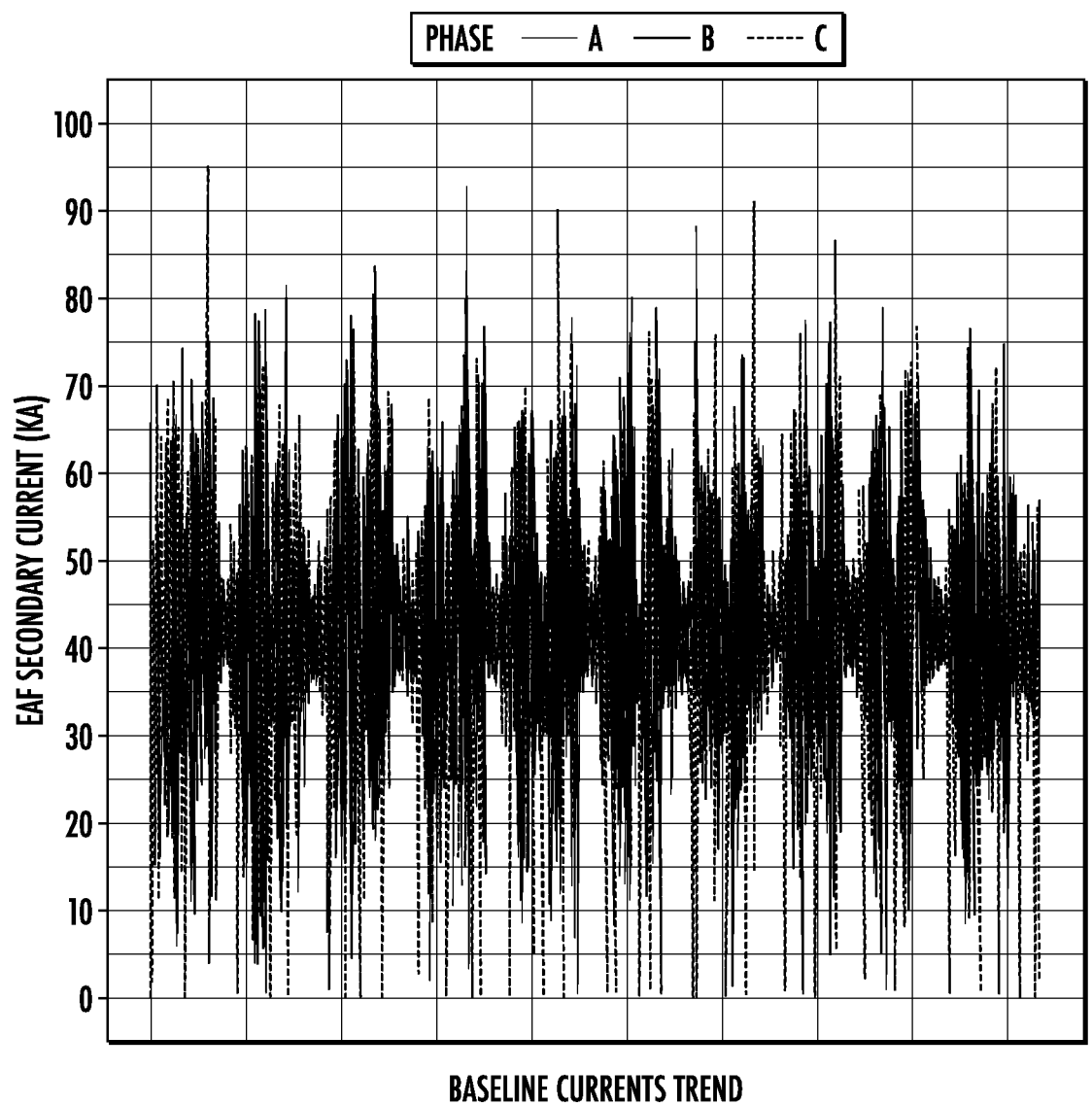
FIG. 6 illustrates trending of a baseline for EAF secondary current by electrical phase.

Parameters controlled by EAF regulation and chemical energy systems are varied throughout operation, sometimes in non-linear and non-deterministic ways due to utilization of set-point ranges and vendor specific dynamic time bases as described above. Continuous parameters that have time varying set-points such as EAF secondary current are tested according to the following methodology:

The baseline measurements and new measurements are aggregated into bins (groups) according to the time base that has been configured for the test. The term, bin, is a term of art in statistics. FIG. 6 illustrates trending of a baseline for EAF secondary current by electrical phase. The baseline current measurements are binned (or grouped) into successive 2.5 charge MWH bins: 0-2.5 charge MWH, 2.5-5.0 charge MWH, 5.0-7.5 charge MWH, etc. for each charge of each heat contained in the baseline current measurements. The statistics of current for each electrical phase are calculated for each bin of each charge (i.e. charge 1 0-2.5 MWH, 2.5-5.0 MWH, . . . , charge 2 0-2.5 MWH, 2.5-5.0 MWH, etc.). Statistical limits for current for each electrical phase are calculated at each bin using these statistics.

Figure 7:
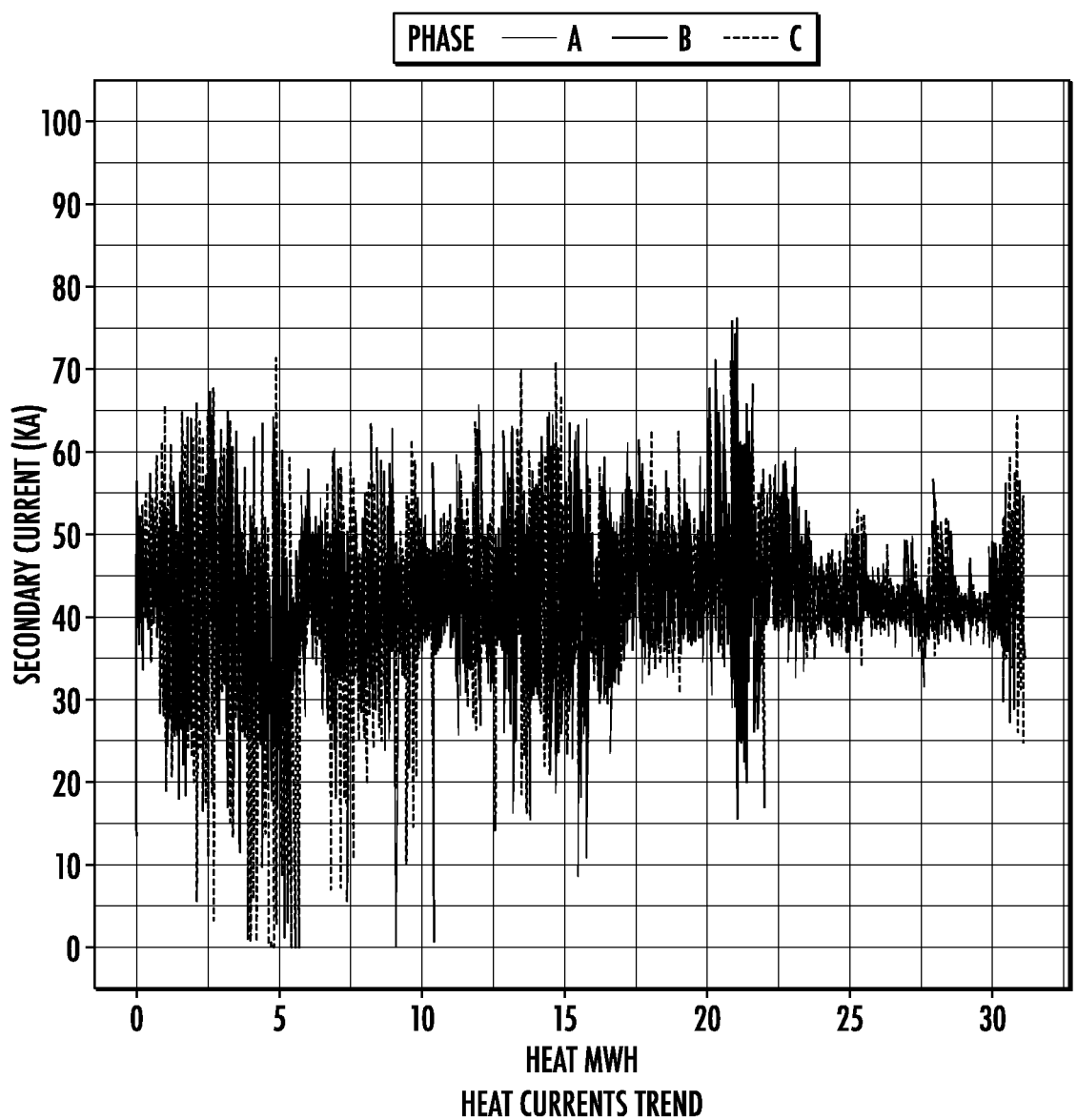
FIG. 7 illustrates a trending of a new heat of the EAF.

FIG. 7 illustrates a trending of a new heat (i.e. the new measurements are not part of the baseline measurements) of EAF secondary current measurements for each electrical phase for the same EAF as the baseline measurements. The heat measurements are binned (or grouped) into the same bins as the baseline measurements for each charge (i.e. charge 1 0-2.5 MWH, 2.5-5.0 MWH . . . charge 2 0-2.5 MWH, 2.5-5.0 MWH, etc.). The statistics of the currents for each electrical phase are calculated for each bin for each charge.

Figure 8:
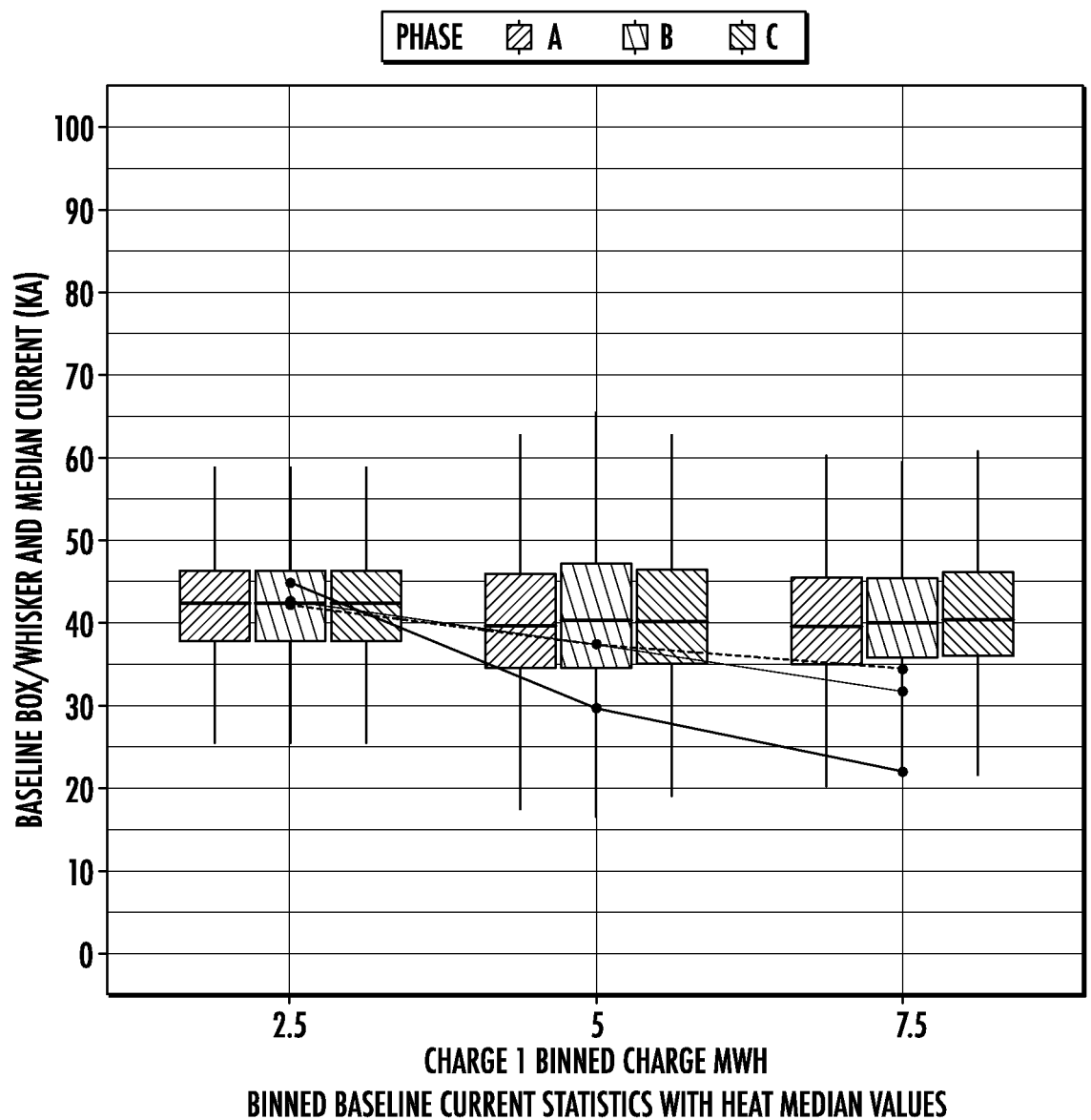
FIG. 8 illustrates binned baseline statistics with heat median values of the EAF.

The statistics of the new current measurements are compared to the statistical limits calculated from the baseline measurements, for each bin of each charge per electrical phase. Wherein the results are not within the predetermined limits then the test fails. FIG. 8 details the baseline statistics per bin per electrical phase for the 1st charge with the new measurements median values of current at each bin overlaid (line with dots). Phase C exceeded the lower limit at the 7.5 MWH bin resulting in test failure.

TABLE 3

Continuous Parameter Example Test Results

| | A-Phase | | | B-Phase | | | C-Phase | | |
| --- | --- | --- | --- | --- | --- | --- | --- | --- | --- |
| Bin | Lower Limit | Value | Upper Limit | Lower Limit | Value | Upper Limit | Lower Limit | Value | Upper Limit |
| 2.5 | 33.2 | 42.2 | 54.9 | 33.0 | 42.7 | 54.8 | 33.6 | 44.8 | 54.7 |
| 5.0 | 27.0 | 37.4 | 56.3 | 26.6 | 37.5 | 58.5 | 28.1 | 29.7 | 56.2 |
| 7.5 | 28.7 | 34.4 | 54.4 | 29.7 | 31.7 | 53.9 | 29.3 | 21.9 | 54.9 |

Test failures are quantified by the test's statistical limits, the statistical value of the parameter and the amount of time that the parameter exceeded the limit at each bin. The results are stored with the failure time and identifier (electrical phase, oxy-fuel burner identifier, etc.) for future reference in the database 110. As was previously discussed, the '160 patent could not perform this failure identification because of its failure to account for and incorporate a time base measurement and therefore suffered from a failure to immediately identify common EAF anomalies to increase EAF efficiency and reliability.

In some cases it is adequate (and preferable) to test continuous parameters by continuous quantification of time at, above or below some limit per heat or per charge (as opposed to aggregation into bins as outlined above). As an example, legacy EAFs without transformer tap changers are sometimes operated using a single electrical set-point (current, impedance, admittance, etc.) of a constant value. The set-point and controlled parameter are continuous parameters but not time varying. In these cases, if the parameter's accumulated time above or below the constant test limit(s) exceeds the test limit time, the test fails.

Figure 9:
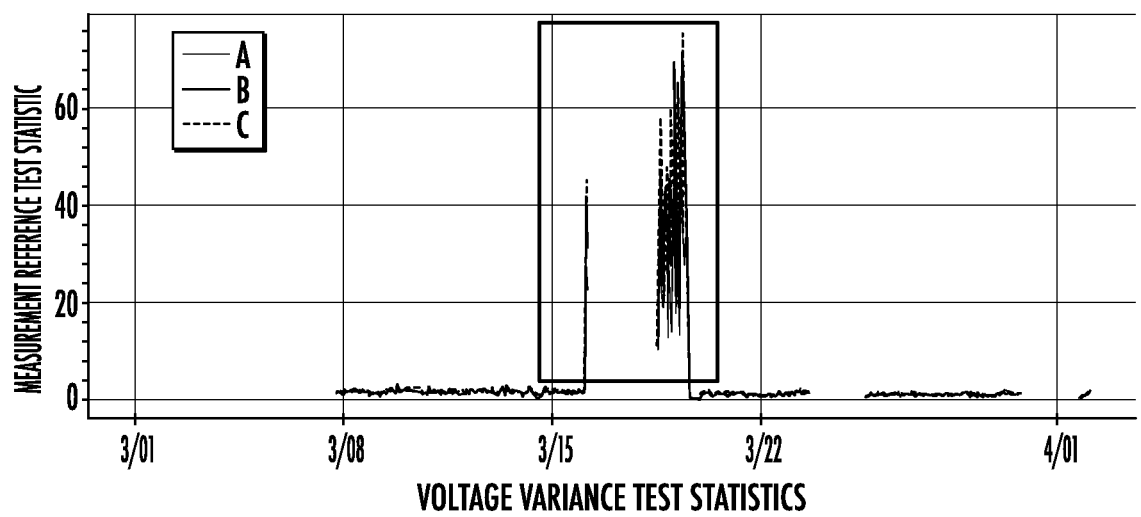
FIG. 9 illustrates voltage variance test statistics of the EAF.

Continuous parameters that should maintain constant variance such as EAF secondary voltage or hydraulic pressure are tested as illustrated by the following example:

EAF secondary voltage nominally exhibits variance from near 0V to the full line to line value of the EAF transformer secondary for the selected tap. Lack of voltage variance is indicative of damage to the voltage measurement system. The baseline voltages are compared to the new measurements voltages per electrical phase using a statistical test for comparison of variances. If the test statistic is greater than the configured limit, the test fails. FIG. 9 details the results of the statistical test for comparison of voltage variances for an EAF. The large increase in the middle of the trend indicates a failure due to the rapid increase of the test statistic.

The value of the test statistic, failure time and identifier (electrical phase, mechanical phase, etc.) are stored for future reference in the local database 122.

Figure 10:
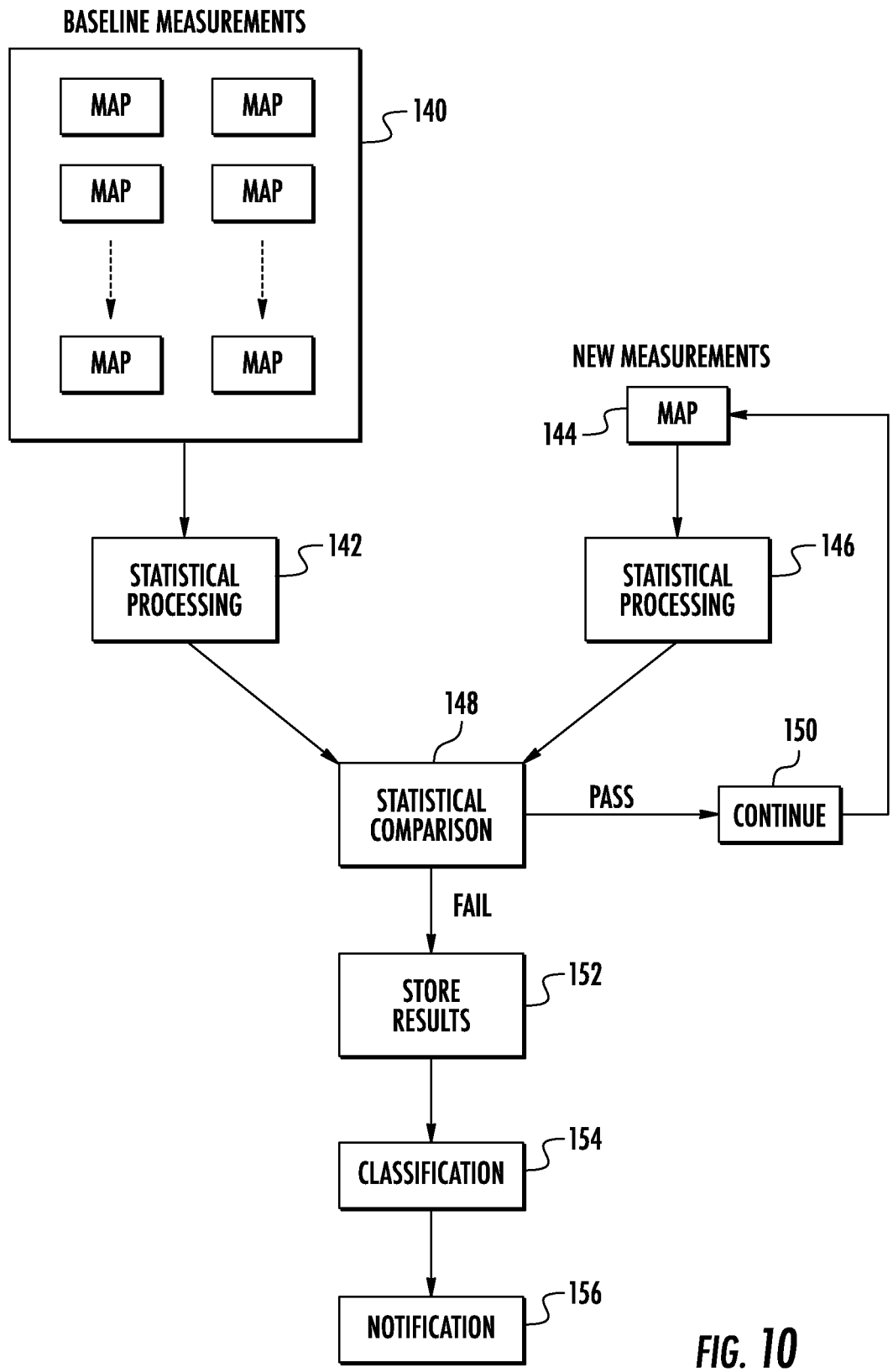
FIG. 10 is a schematic illustration of a method for monitoring discrete EAF parameters and identifying, classifying and sending notification of EAF anomalies

Discrete parameters that should maintain constant central tendency throughout a MAP such as EAF power system 104 transmission voltage, transformer temperatures or per charge energy consumption are tested according to the methodology illustrated in FIG. 10. FIG. 10 illustrates at block 140 the step of establishing the base line MAP. At block 142, the base line MAP is then statistically processed.

At block 144 new measurements are continually received and subject to statistical processing as illustrated at block 146. A statistical comparison is done, block 148, and if the test does not fail then no classification or notification of a failure is made as seen at block 150 where new measurements are continued to be taken. However, if the test fails, as illustrated at block 152, the result is stored.

Further, because a discrete parameter was tested, no logic testing is required to classify the anomaly as it is indicated by the failed discrete parameter itself. Notification of the failure as previously discussed may be sent to a configurable list of recipients. It merits noting as well, as previously discussed, where no new measurements are received of the discrete parameter for a predetermined amount of time, then notification of this failure is stored and notification is sent to the configurable list of recipients.

Assuming the MAP is per heat, the heat central tendency of the parameter's baseline measurements is calculated. The dispersion of the parameter's baseline measurements is calculated. The central tendency or accumulated value of the parameter in the new measurements is calculated. If the central tendency or accumulated value of the measured parameter exceeds the central tendency of the parameter's baseline by a configured multiple of the parameter's baseline dispersion (greater than the upper limit and/or less than the lower limit), the test fails.

The following example illustrates application of the methodology for testing discrete parameters for detection of charge over-melting. EAFs are most efficient when the arcs and oxy/fuel burners are transferring radiative heat energy to scrap and so it is important that the operator only melt enough scrap to fit the next charge of scrap material into the vessel. If the operator melts longer than the minimum amount of time to fit the next charge of scrap material it results in unnecessary energy consumption and decreased production rate. This practice is referred to as over-melting.

Figure 11:
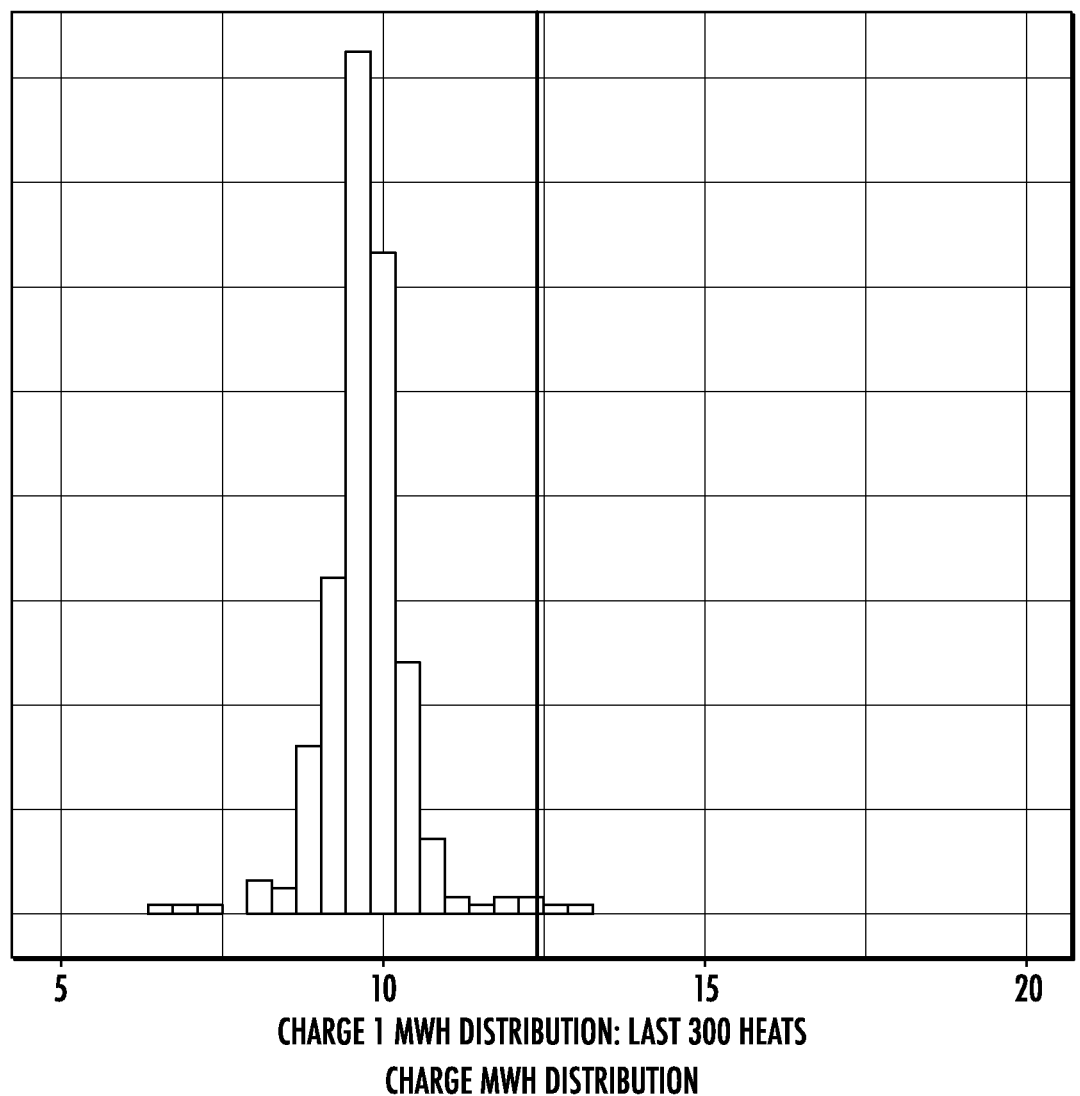
FIG. 11 illustrates an example of charge MWH distribution of the EAF.

The per charge central tendency and dispersion of the baseline measurements energy consumption is calculated. The per charge energy consumption of the new measurements is compared to the baseline central tendency plus a configured multiple of the baseline dispersion. If the per charge energy consumption of the new measurements exceeds the baseline central tendency plus the configured multiple of baseline dispersion, the test fails. FIG. 11 provides a distribution of baseline measurements of per-charge energy input into first charges of an EAF. The limit in terms of charge MWH was calculated to be 11.8 MWH and the EAF was operated until 12.4 MWH, resulting in additional energy consumption and increased production time. The value of the test limit, measured value and failure time are stored for future reference in the local database 122.

In some cases, such as a parameter with negligible dispersion, it is adequate to compare the measured central tendency of the new heat parameter to a constant value and to consider the test failed if it exceeds the limiting constant value (over or under limit depending on the parameter).

Figure 12:
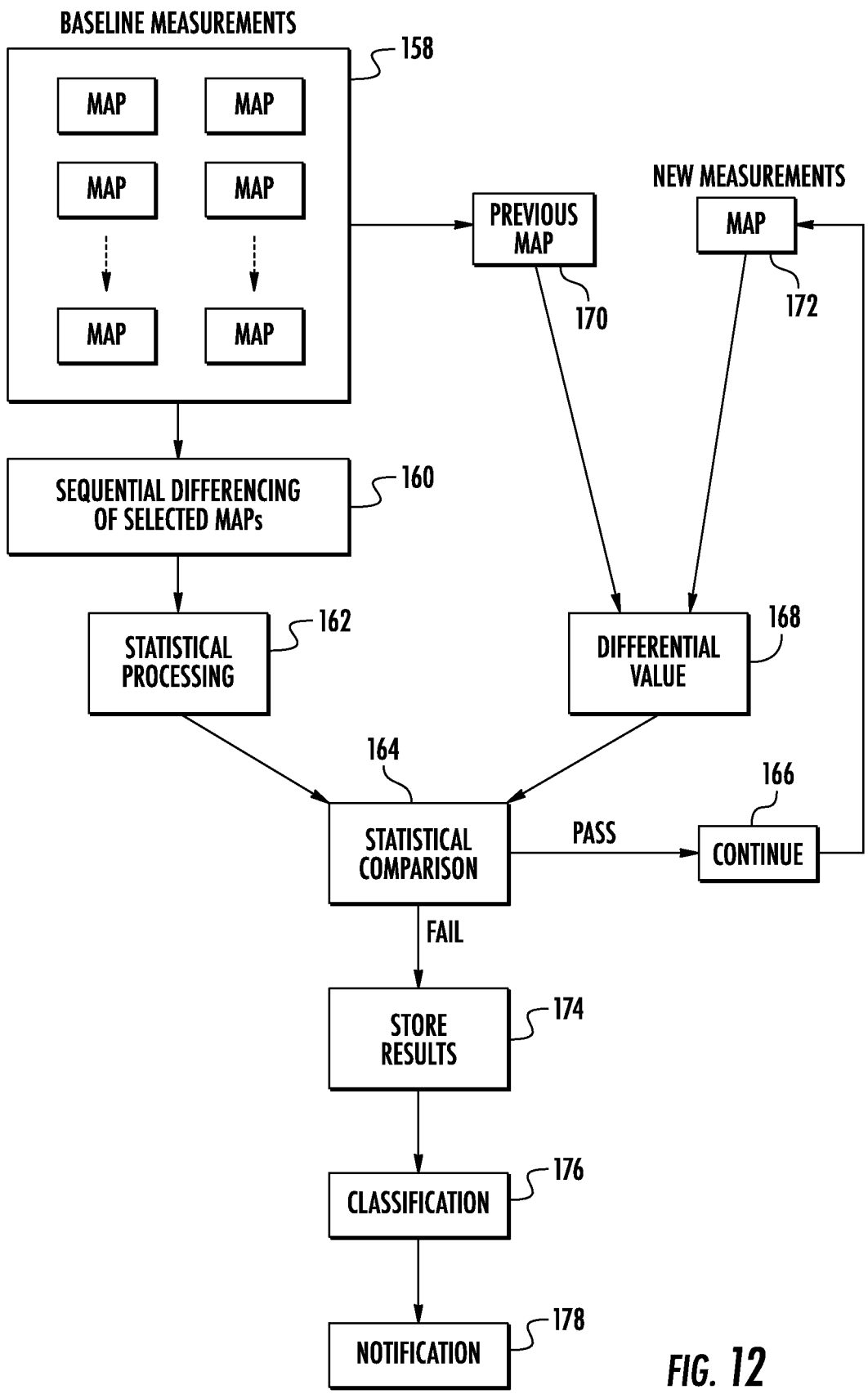
FIG. 12 is a schematic illustration of a method for monitoring differential EAF parameters and identifying, classifying and sending notification of EAF anomalies.

Differential parameters that should maintain a limited rate of change between MAPs such as graphite electrode column weight from one heat to the next, are tested according to the methodology illustrated at FIG. 12 where the MAP is one heat. As illustrated, the baseline MAP is determined at block 158. There is then a sequential differencing of selected MAPs as illustrated at block 160 and statistical processing as shown at block 162. The statistical testing occurs at block 164 where if no failure is indicated then continued measurements occur at block 164. Alternatively, depending on the differential parameter, the differential value, block 168, may be obtained between a previous baseline MAP, block 170 and new measurements as indicated at block 172. The central tendency and dispersion of the heat to heat difference of a parameter is calculated for a series of heats. The differential value is then subjected to statistical comparison, block 164.

In either of the above cases, if the difference exceeds the central tendency by a configured multiple of the dispersion parameter, the test fails and the result is stored as indicated at block 174 and thereafter classification and notification to a configurable lists of recipients which is as previously discussed. Further, not diagramed is the sequence, as has been previously discussed, where no new measurements are received of the differential parameter for a predetermined amount of time, then notification of this failure is stored and notification is sent to the configurable list of recipients.

The following example illustrates application of the methodology for testing differential parameters for detection of non-linear graphite consumption.

Graphite electrodes are used in EAFs to conduct current into the arcs. Graphite is continuously consumed during EAF operation. Graphite electrode must be periodically added and the new section is threaded and torqued into the existing section. The threaded joint between sections can be a weak spot in the column. Under certain circumstances the bottom most section of an electrode column can separate at the joint and fall into the EAF resulting in increased production cost due to the loss of graphite. This is commonly referred to as "butt loss." Detection of electrode butt loss is performed by utilizing the differential change in hydraulic pressure per phase between heats (note that this could also be accomplished using the change in pressure between charges or some fixed time interval). As previously discussed, FIG. 4 details typical change in per-heat central tendency of hydraulic pressure per phase over several heats. In this case the per-heat median value was used as the measure of central tendency. The nominal change in median value from heat to heat is noisy (i.e. not linear, not deterministic) and variable.

The central tendency and dispersion of the heat to heat difference in hydraulic pressure for a series of previous heats is calculated for each phase. The difference in the central tendency of the hydraulic pressure between the new heat's measurement and previous heat's measurement is calculated. If the calculated difference exceeds the calculated values of central tendency of difference by a configured multiple of the dispersion parameter, the test fails.

Figure 13:
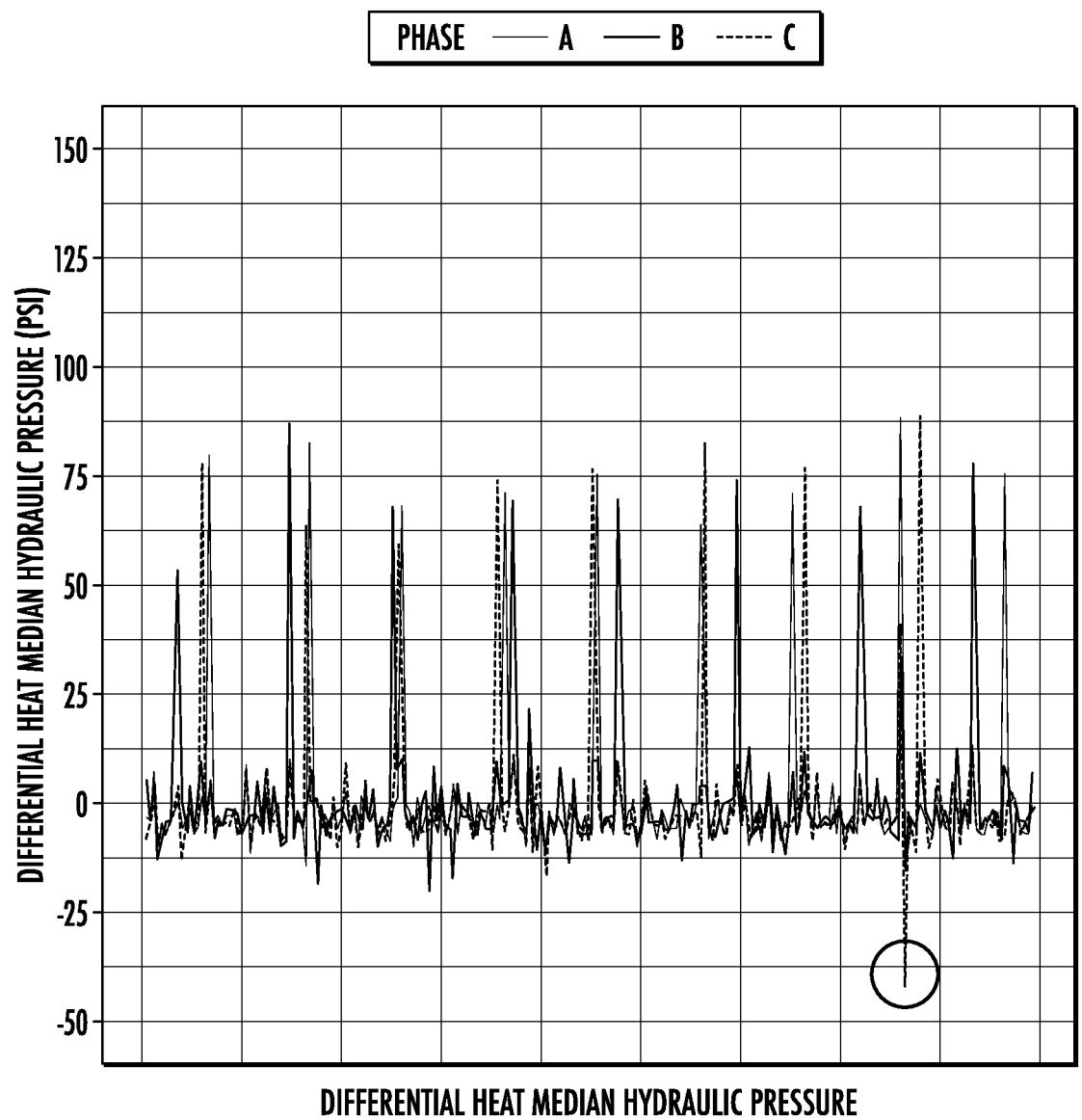
FIG. 13 illustrates differential heat median hydraulic pressure of the EAF.

FIG. 13 details a typical EAF differential heat median hydraulic pressure per phase over a series of heats. The large positive spikes indicate addition of electrode which increases the weight on the cylinder and therefore the hydraulic pressure. The indicated negative spike indicates an electrode butt loss event on phase C. The calculated test limit at this event was −25.8 PSI pertaining to dispersion calculated using median absolute deviation at a multiple of 5. The measured differential heat median hydraulic pressure at the test failure was −42.1 PSI.

In some cases such as a parameter with negligible dispersion, it is adequate to compare the statistics of the measured parameter difference to a constant value and to consider the test failed if it exceeds the limiting constant value (over or under limit depending on the parameter). The value of the test limit, measured value, identified phase involved and failure time are stored for future reference in the local database 122.

Upon detection of a failure, the failure is classified. For example, the statistical tests of continuous parameters such as voltage and current can fail for multiple reasons. A series of logical tests are performed in order to deduce the cause of failure when a statistical test of a continuous parameter fails.

A series of statistical and logical tests are performed using at least one of the following parameters upon failure of a statistical test of a continuous parameter: EAF mast position; EAF mast hydraulic pressure; EAF regulator output signal; EAF transformer tap position; EAF series reactor tap position; EAF series reactor bypass breaker state; Utility transformer tap position; EAF control set-point. For each failure identified, the classification algorithm is executed by the identifier (electrical phase, burner, etc.) for each MAP and bin. For example, for an under-voltage failure detected on electrical phase-B at 5 KWH/Charge Ton during a 3rd charge and an over-voltage failure detected on electrical phase A at 25 KWH/Charge Ton during the same 3rd charge in the same heat, the failure classifier would execute twice, once for each failure.

The failure cause is then classified as one of the following: Non-conductive charge material in the EAF; Electrode mast locked; Electrode mast at low limit; Short graphite electrode; Tap position manually changed by operator; Excessive regulation system control error; Regulation system control profile changed; Hydraulic valve degradation; Electrode mast binding or blockage; Hydraulic accumulator degradation; Excessive arc instability.

Figure 14:
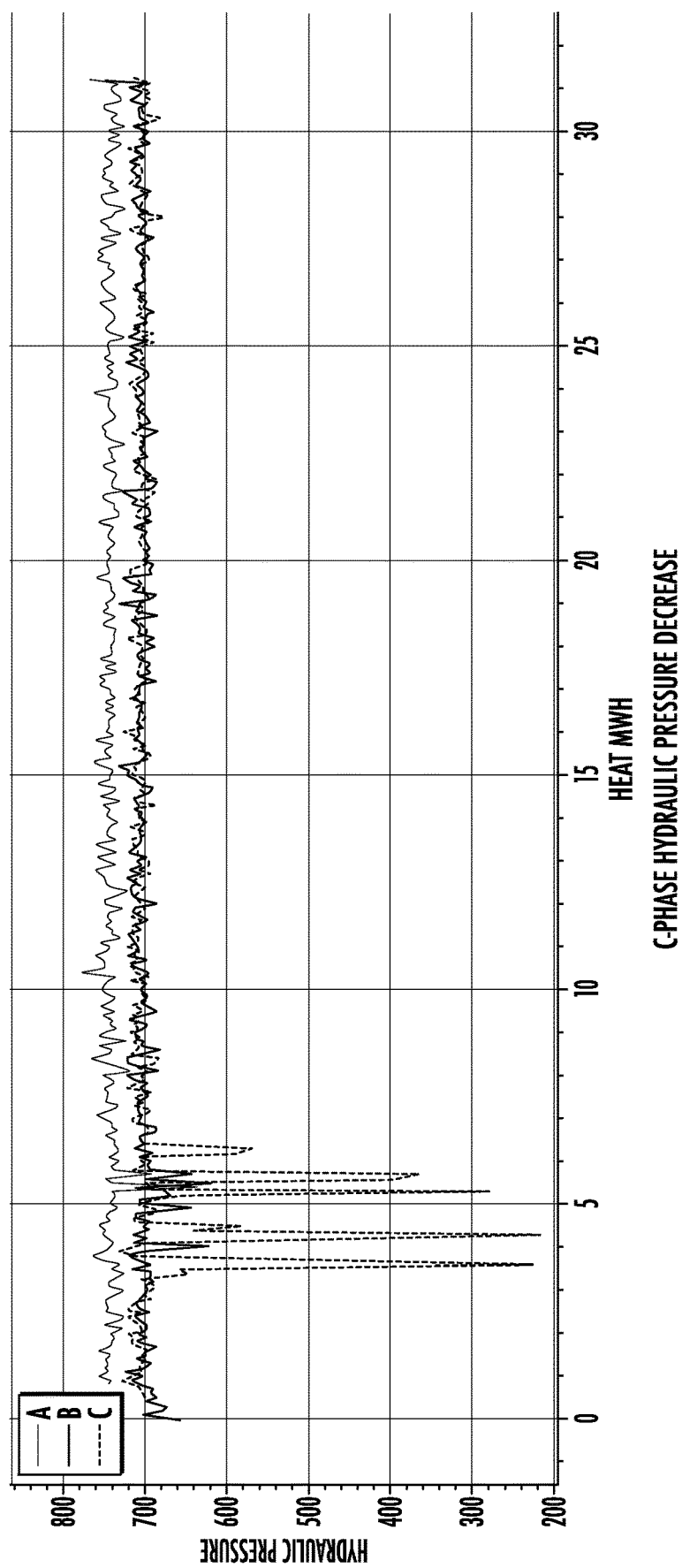
FIG. 14 illustrates the C-phase hydraulic pressure decrease of the EAF.

FIG. 14 illustrates the hydraulic pressure trended over the heat for the under-current failure continuous parameter example provided. The failure classification algorithm detects the decrease in hydraulic pressure and indicates that the under-current is due to the C-phase mast at low limit.

Discrete and differential parameter tests are specific, i.e. they are performed in order to detect a specific issue. Therefore, the cause of failure of a test of a discrete or differential parameter is known and does not require classification.

Once the failure has been identified and classified then notification of a test failure or sequence of test failures is provided immediately upon detection to a configurable list of recipients. The failure or anomaly is quantified in terms of the units of the parameter, the test limits and the amount of time the parameter exceeded the test limits. A failure report containing a description of the test failure is generated and transmitted to the configured list of recipients. The rapid notification enables plant personnel to manage the issue immediately resulting in improved EAF efficiency and performance and is a significant improvement in advancing EAF technology.

The logic testing of a continuous parameter to classify the failure compares at least one of the failed statistical tests to an indicator. For example, if the failure is under-current and overvoltage with an indication of variation in EAF regulator output signal results in a classification of non-conductive material in the EAF. If the failure is under current and over-voltage with no indication of EAF regulator output signal variation then the classification is electrode mast locked. If the failure is under-current or over-voltage and the indicator is percent of time regulator output is varying and the indicator exceeds a pre-configured limit then the classification is electrode mast at low limit. If the failure is under-current and the indicator is low hydraulic pressure then the classification is short graphite electrode. If the failure is under-current or under-voltage or over-current or over-voltage and the indicators are measured transformer or reactor tap statistical distribution differing from baseline tap statistical distribution then the classification is tap position manually changed by the operator.

If the failure is under-current or under-voltage or over-current or over-voltage and the indicator is regulation system percent error and the indicator exceeds a pre-determined limit then the classification is excessive regulation system control error. If the failure is under-current or under voltage or over-current or over-voltage and the indicators are measured set-point statistical distribution differs from baseline set-point statistical distribution then the classification is regulation system control profile changed. If the failure is under-current or under-voltage or over-current or over-voltage and the indicators are the ratio of variance of measured hydraulic pressure to baseline hydraulic pressure exceeds a pre-determined limit and the regulation system percent error exceeds a pre-determined limit for the entire MAP then the classification is hydraulic valve degradation.

If the failure is under-current or under voltage or over-current or over voltage and the indicators are the ratio of variance of measured hydraulic pressure to baseline hydraulic pressure exceeds a pre-determined limit and the regulation system percent error exceeds a pre-determined limit for a partial MAP, then the classification is electrode mast binding/blockage. If the failure is under-current or under-voltage or over-current or over-voltage and the indicator is the ratio of variance of measured hydraulic pressure to baseline hydraulic pressure exceeds a pre-determined limit then the classification is hydraulic accumulator degradation.

If the failure is under-current or under-voltage or over-current or over-voltage and the indicator is ratio of measured voltage or current variance to baseline voltage or current variance exceeds a pre-determined limit then the classification is excessive arc instability. If the failure is chemical system flow rate error and the indicator is measured set point statistical distribution that differs from the baseline set-point statistical distribution then the indicator is profile error. If the failure is chemical energy system flow rate error and the indicator is the measured set-point statistical distribution is equivalent to the baseline set-point statistical distribution then the classification is obstructed flow.

In light of the foregoing disclosure, embodiments of the invention provide a technological advance over existing EAF systems and methods because here to for, EAF systems and methods did not detect and classify anomalies based on an initialization of EAF state measurements providing a baseline against which further continuous EAF state measurements are statistically tested to determine anomalies/failures with such failures subject to classification for discrete and differential parameters and to logic testing for continuous parameters, followed by sending notification to a configurable list of recipients.

Figure 15:
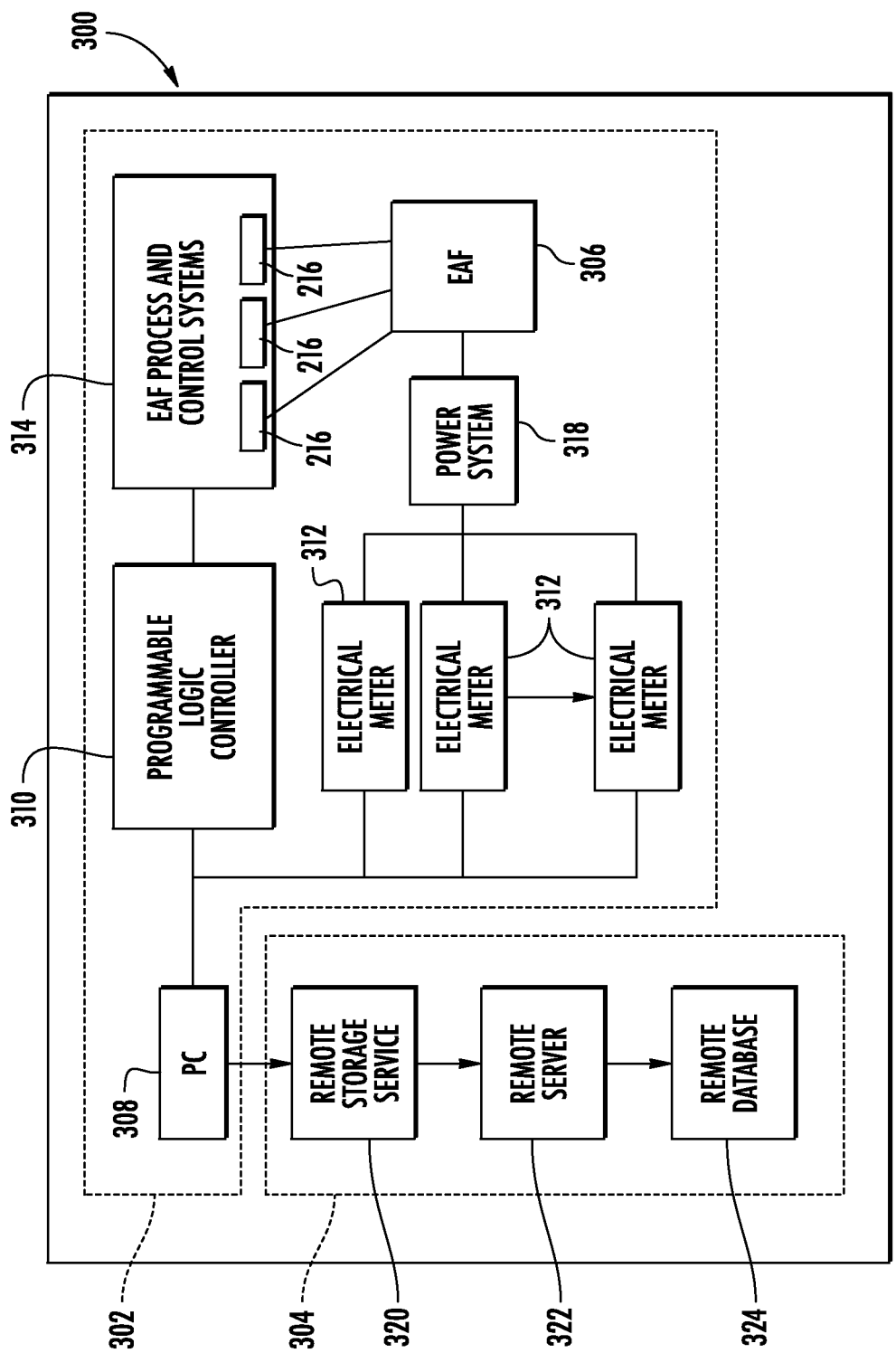
FIG. 15 is a schematic illustration of an EAF system configured to monitor EAF measurements and identify, classify and send notification of EAF anomalies.

Turning to FIG. 15, an EAF system 300 according to the teachings of the instant invention is illustrated. The EAF system 300 includes an onsite EAF system 302 and a remote EAF system 304. The EAF system 300 is illustrative of the versatility of the method in that, as has been described, a device with storage and a processor, such as a remote server, can be utilized to carry out the method heretofore described to identify, classify, and notify a configurable list of recipients of anomalies in an EAF 306 so as to be able to timely fix the anomaly or anomalies to optimize efficiencies of the EAF. Hereto, the possibility of automated remote troubleshooting, and more particularly, automatic remote classification of an anomaly, using the statistical testing to identify the anomaly and the logic testing where a continuous parameter is measured has not been known or practiced.

The onsite EAF system 304 includes the EAF 306 that is communicably coupled to a PC 308 with executing system software. The PC 308 is communicably coupled to one or more programmable logic controllers (PLC) 310 and one or more electrical metering devices 312. The PLC 310 communicates with the PC 308 state measurements of the EAF 306 from an EAF process and control system 314. The EAF process and control system 314 includes a plurality of controllers 316 which receive sensed measurements from the EAF 306 and provide set-points for the desired parameters of state measurements of the EAF 306.

The electrical metering devices 312 are communicably coupled to one or more power system 318 to power the EAF 306 with three phase AC power. As previously discussed, it is not the intent that DC EAF's are left uncovered by the teachings of embodiments of the invention. Indeed, one familiar with the art can readily appreciate, given the instant disclosure that the teachings are applicable to DC EAF's.

The remote system 304 includes a remote storage service 320 communicably coupled to the PC 308 as well as a remote server 322. The remote server 322 is communicably coupled to a remote database 324.

Figure 16:
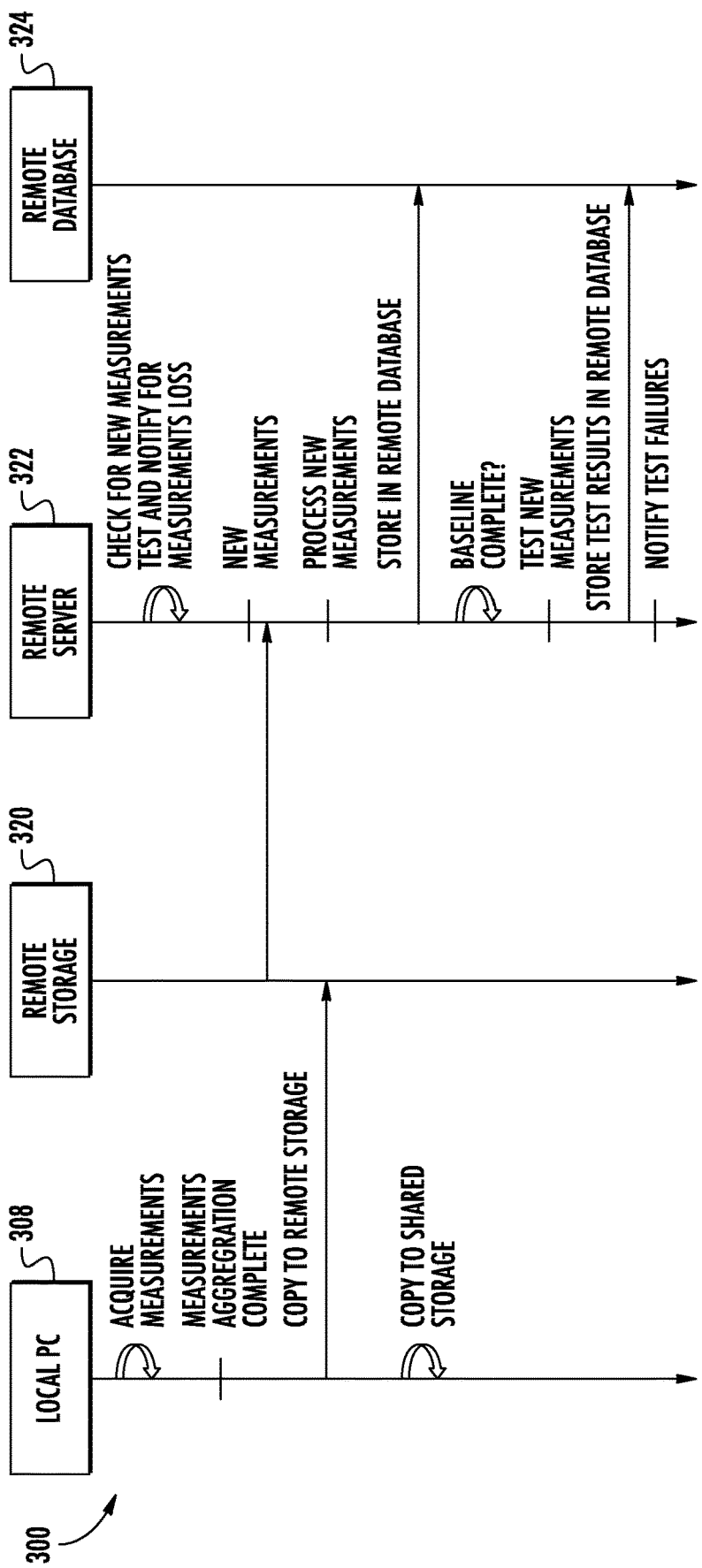
FIG. 16 is another schematic illustration of the EAF system and the method for monitoring EAF measurements and identifying, classifying and sending notification of EAF anomalies.

The method for monitoring the EAF 306 measurements and identifying, classifying and notifying a user of anomalies shown in FIG. 5's block diagram is carried out by the system 300 as will be further discussed with reference to FIG. 16.

As illustrated at PC 306, during the step of establishing the baseline measurements EAF state parameters are sampled at a fixed rate. Measurements are grouped together over a measurement aggregation period (MAP). A MAP typically corresponds to an EAF steel batch (a heat), but can also be defined by a number of samples or a fixed time interval.

The state measurements are transferred to the remote storage service 320 upon completion of the MAP. The remote server 322 checks for new measurements on the remote storage service 320 at a fixed time interval, processes the new state measurements and stores the processed measurements in the remote database 324.

No testing of the measurements takes place until the minimum number of measurements has been processed and stored in the remote database 324. This initial group of untested measurements is assumed to represent nominal process conditions and is referred to as a baseline. The size of the baseline is configurable and usually defined by a number of heats, but can also be defined by a number of measurements samples or by an amount of time.

The baseline can be re-initialized at any time and this process is referred to as rebaselining. The existing system baseline is deleted and measurements acquisition starts over. Rebaselining becomes necessary when intentional equipment, process or process control modifications are conducted that result in a shift of a parameter's statistics.

As previously discussed with respect to measuring step, after completion of the baseline, the EAF system 300 continues to acquire sate measurements at a fixed sample rate. The state measurements are collected into a file in the PC's 308 memory until the completion of the MAP. Upon completion of the MAP the measurements file is closed and a new state measurements file is created for the next MAP.

Completed state measurements files are copied to the remote storage service 320 at a fixed time interval (e.g. 15 minutes). A copy of the measurements file is stored locally on the PC 308 and made available to the EAF system 300 users. The state measurements are stored in a file format suitable for use with common business software as previously discussed.

The remote server 320 checks for new measurements files in the remote storage service 320 at a fixed time interval. If a new measurements file is available, it is processed and stored in the remote database 324. If the baseline is complete the new measurements are tested and the test results are stored in the remote database 324.

If no new measurements are available in the remote storage service 324, the remote server 322 calculates the amount of time that has transpired since receiving new measurements. If the amount of time exceeds a configured limit, a notification is provided to a configurable list of email recipients.

Concerning the testing, when the baseline is completed and new state measurements become available the remote server 322 performs statistical comparisons of the new measurements and the baseline. The baseline is loaded into the remote server 322 memory from the remote database 324 and pre-processed as necessary depending on the statistical test to be performed as has been previously discussed. As has been previously discussed, the specific statistical test performed depends on the parameter being tested. Parameters can be generally classified as continuous, discrete, and differential.

If a statistical test fails then the identified anomaly is classified for a discrete or differential parameter or subject to logical testing to classify a continuous parameter anomaly. Notification of the classified anomaly is sent to a configurable list of recipients of the system 300. Additionally, the classified anomaly is stored in the remote database 224. The steps of the statistical testing carried out to identify the anomaly are the same as that which was described previously with respect to the EAF 100 as is the logic testing to classify a continuous parameter anomaly.

While it is the intent the EAF 306 could be automatically adjusted once the anomaly has been identified and classified, it is recognized that most, if not all, EAF plants do not permit such automation given the costly equipment and the harsh operating environments. However, armed with the teachings of the embodiments of the inventions, now with continuous and current state measurements undergoing continuous monitoring and testing, classified anomalies are nearly immediately sent to recipients who can take immediate action to make the EAF 306 more reliable and efficient than has here to fore been possible and advancing thereby, in at least this way the state of the art in EAF technology.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for identifying, classifying, and sending notification of an electric arc furnace's (EAF) anomalies to improve the EAF efficiency and reliability, the method comprising the steps of:

establishing baseline state measurements of the EAF;
receiving new state measurements of the EAF;
statistically testing the new state measurements against the baseline state measurements;
identifying as an anomaly a failed statistical test;
classifying the identified anomaly;
sending notification of the classified anomaly to a configurable list of recipients;
wherein the statistical test is based upon a selected one of the new state measurements;
wherein the selected one of the new state measurements is a continuous parameter;
wherein the statistical testing of the continuous parameter includes the steps of:

dividing the baseline state measurements and new state measurements of the continuous parameter into baseline bins and new measurement bins according to a time base;
comparing each of the new measurement bin statistics of the continuous parameter to the baseline bin statistics of the continuous parameter; and
wherein the statistical test fails where the new measurement bin statistics of the continuous parameter exceed limits of the baseline bin statistics.

2. The method of claim 1, wherein the baseline state measurements and the new state measurements are at least a one of an electrical system measurement, a mechanical system measurement and an EAF process system measurement.

3. The method of claim 2, wherein the electrical system measurement is one of per-phase current, voltage, impedance, admittance, resistance, reactance, power factor, real energy, real power, reactive power, apparent power, symmetric components of voltage, symmetric components of current, frequency, harmonic distortion of current, harmonic distortion of voltage, and distortion power factor.

4. The method of claim 2, wherein the mechanical system measurement is one of electrode mast hydraulic pressure, hydraulic valve spool position, electrode mast position, regulation system output value, shell and roof cooling water temperatures, transformer water temperature, transformer oil temperature, utility transformer tap position, EAF transformer tap position, reactor tap position, reactor bypass breaker state, oxy/fuel burner gas flow rate, oxy/fuel burner oxygen flow rate, carbon injector carbon flow rate and lime injector lime flow rate.

5. The method of claim 2, wherein the EAF process system measurement is one of charge number, weight of charged material, weight of tapped steel, power on time, power off time, steel temperature, steel carbon content, steel oxygen content and slag composition.

6. The method of claim 1, wherein the step of statistically testing the baseline state measurements against the new state measurements is done by a local PC.

7. The method of claim 1, wherein the step of statistically testing the baseline state measurements against the new state measurements is done by a remote server.

8. The method of claim 1, wherein the step of establishing baseline state measurements includes the step of taking state measurements at a fixed rate.

9. The method of claim 8, wherein the step of establishing the baseline state measurements includes the step of grouping state measurements together over a measurement aggregation period (MAP), the MAP determined by at least one of a heat, charge, number of samples, and a fixed time interval.

10. The method of claim 9, wherein the step of grouping state measurements together over a MAP includes the step of establishing a baseline MAP to establish the baseline state measurements, closing the baseline MAP file, and storing the baseline MAP file in one of or both of an onsite PC and remote storage.

11. The method of claim 10, wherein the step of storing the baseline MAP includes the step of including a baseline control profile identifier for the baseline MAP.

12. The method of claim 10, wherein the step of obtaining new state measurements is based upon the MAP, each new MAP stored in one or both of the local PC and a remote storage.

13. The method of claim 12, wherein the step of storing the new MAP includes the step of storing a new control profile identifier with the new MAP.

14. The method of claim 1, wherein the step of identifying as an anomaly a failed statistical test includes the step of identifying as an anomaly a failure to receive new state measurements over a predetermined time.

15. The method of claim 1, wherein the step of classifying includes the step of quantifying the units of the identified anomaly, the test limits for a parameter of the anomaly, and the amount of time the parameter exceeded the test limits.

16. The method of claim 1, wherein the time base is one of or a combination of heat time, charge time, heat energy, charge energy, heat energy per heat ton, charge energy per charge ton.

17. The method of claim 1, wherein the step of selecting the continuous parameter includes the step of selecting the continuous parameter from one of an EAF current, EAF voltage, EAF impedance, EAF admittance, EAF arc resistance, EAF reactance, EAF real power, EAF reactive power, EAF apparent power, EAF power factor, EAF regulation error, EAF regulation set-point, EAF transformer tap position, series reactor tap position, series reactor bypass breaker state, utility transformer tap position, oxy-fuel burner gas flow rate, oxy-fuel burner oxygen flow rate, carbon injection carbon flow rate and lime injection lime flow rate.

18. The method of claim 1, wherein the statistical testing of the continuous parameter includes the step of testing continuous parameters by continuous quantification of time at, above or below a predetermined limit per one of a heat, charge, number of samples, and a fixed time interval.

19. The method of claim 1, wherein the step of classifying the anomaly includes the step of performing logic testing based on the failed statistical test, the logic test including the step of comparing at least one of the failed statistical tests to an indicator.

20. The method of claim 19, wherein the indicator is a one of, variation in EAF regulator output, no variation in regulator output, percent of time regulator output is varying greater than a minimum limit, low hydraulic pressure, a measured transformer tap position statistical distribution different than a baseline state statistical distribution, a measured reactor tap position statistical distribution different than the baseline state statistical distribution, regulation system percent error greater than a selected limit, a measured set-point statistical distribution different than a baseline state set-point statistical distribution, a ratio of changing measured hydraulic pressure to a baseline hydraulic pressure greater than a selected limit for an entire MAP, a ratio of variance of measured hydraulic pressure to a baseline hydraulic pressure greater than a selected limit and for a partial MAP, a ratio of variance of a measured hydraulic pressure to a baseline hydraulic pressure greater than a selected limit, a ratio of variance of measured voltage to baseline voltage greater than a selected limit, a ratio of variance of measured current to baseline current greater than a selected limit, a measured set-point statistical distribution equivalent to a baseline set point statistical distribution.

21. A method for identifying, classifying, and sending notification of an electric arc furnace's (EAF) anomalies to improve the EAF efficiency and reliability, the method comprising the steps of:
establishing baseline state measurements of the EAF;
receiving new state measurements of the EAF;
statistically testing the new state measurements against the baseline state measurements;
identifying as an anomaly a failed statistical test;
classifying the identified anomaly;
sending notification of the classified anomaly to a configurable list of recipients;
wherein the statistical test is based upon a selected one of the new state measurements;
wherein the selected one of the new state measurements is a discrete parameter; parameter;
wherein the discrete parameter is a central tendency parameter and wherein the statistical testing of the central tendency parameter includes the steps of:
establishing the baseline measurements of the central tendency parameter over a measurement aggregation period (MAP), the MAP determined by a first heat;
calculating a baseline central tendency of the baseline measurements of the central tendency parameter;
calculating a dispersion parameter of the baseline measurements of the central tendency parameter;
calculating from the new measurements of the central tendency parameter a new central tendency of the central tendency parameter for a new heat; and
wherein the statistical test fails when the baseline central tendency of the new heat exceeds the baseline central tendency by a configured multiple of the dispersion parameter.

22. The method of claim 21, wherein the discrete parameter is one of a transformer temperature, a heat current, a transmission voltage and per charge energy consumption.

23. A method for identifying, classifying, and sending notification of an electric arc furnace's (EAF) anomalies to improve the EAF efficiency and reliability, the method comprising the steps of:
establishing baseline state measurements of the EAF;
receiving new state measurements of the EAF;
statistically testing the new state measurements against the baseline state measurements;
identifying as an anomaly a failed statistical test;
classifying the identified anomaly;
sending notification of the classified anomaly to a configurable list of recipients;
wherein the statistical test is based upon a selected one of the new state measurements;
wherein the selected one of the new state measurements is a discrete parameter;
wherein the discrete parameter is a central tendency parameter and wherein the statistical testing of the central tendency parameter includes the steps of:
calculating a central tendency of the central tendency parameter from the new measurements of the central tendency parameter over a measurement aggregation period (MAP), the MAP determined by a one of a heat, charge, number of samples and period of time;
comparing the calculated central tendency to a constant value; and
wherein the statistical test fails when the calculated central tendency exceeds the constant value.

24. The method of claim 1, wherein the notification is sent to at least one of a PC, a server, a controller, a PLC, and a display.

25. A method for identifying, classifying, and sending notification of an electric arc furnace's (EAF) anomalies to improve the EAF efficiency and reliability, the method comprising the steps of:
establishing baseline state measurements of the EAF;
receiving new state measurements of the EAF;
statistically testing the new state measurements against the baseline state measurements;
identifying as an anomaly a failed statistical test;
classifying the identified anomaly;
sending notification of the classified anomaly to a configurable list of recipients;

wherein the statistical test is based upon a selected one of the new state measurements;
wherein the selected one of the new state measurements is a differential parameter;
wherein the statistical testing of the differential parameter includes the steps of:
selecting as the differential parameter to be statistically tested a differential parameter of a MAP of a one of a heat, charge, number of samples or period of time;
establishing the baseline measurements of the discrete parameter;
calculating a baseline central tendency of the heat to heat difference of the baseline measurements of the discrete parameter;
calculating a baseline dispersion of the heat to heat difference of the baseline measurements of the discrete parameter;
calculating the difference between the new measurements of the discrete parameter from a new heat and the baseline measurements of the discrete parameter; and
wherein the statistical test fails when the calculated difference exceeds the baseline central tendency by a configured multiple of the calculated baseline dispersion.

26. A method for identifying, classifying, and sending notification of an electric arc furnace's (EAF) anomalies to improve the EAF efficiency and reliability, the method comprising the steps of:
establishing baseline state measurements of the EAF;
receiving new state measurements of the EAF;
statistically testing the new state measurements against the baseline state measurements;
identifying as an anomaly a failed statistical test;
classifying the identified anomaly;
sending notification of the classified anomaly to a configurable list of recipients;
wherein the statistical test is based upon a selected one of the new state measurements wherein the selected one of the new state measurements is a differential parameter;
wherein the statistical testing of the differential parameter includes the steps of:
selecting as the differential parameter to be statistically tested a differential parameter of a MAP of a one of a heat, charge, number of samples or period of time;
calculating the difference between the measurements of the discrete parameter from new measurements of the discrete parameter from the next one of the heats and the measurements of the discrete parameter of the first heat; and
wherein the statistical test fails when the calculated difference exceeds a constant value.

27. The method of claim 1, wherein the statistical test results are stored in a PC data base.

28. The method of claim 1, wherein the statistical test results are stored in a remote database.

29. The method of claim 1, wherein the step of classifying any failed statistical test includes the step of classifying a failure to receive a one of the new measurements over a predetermined time and notifying the user of the failure to receive the measurement.

30. A non-transitory computer readable medium comprising programming instructions configured to perform the method of claim 1.

31. The method of claim 1, wherein the efficiency is measured by a key process indicator.

32. The method of claim 1, further comprising the steps of storing in delimited text files, the baseline state measurements and the new state measurements and making the delimited text files accessible on an Ethernet network.

33. The method of claim 1, wherein the configurable list of recipients are email addresses.

34. A system for continuous monitoring of an Electric Arc Furnace (EAF) to identify and classify EAF anomalies to improve the EAF efficiency, the system comprising:
a device configured to:
receive and establish baseline state measurements of the EAF;
receive new state measurements of the EAF;
perform statistical testing of the baseline state measurements against the new state measurements;
wherein the new state measurements may be one of a continuous parameter, a discrete parameter, and a differential parameter;
wherein where the new state measurements is the continuous parameter the statistical testing of the continuous parameter includes the steps of:
dividing the baseline state measurements and new state measurements of the continuous parameter into baseline bins and new measurement bins according to a time base;
comparing each of the new measurement bin statistics of the continuous parameter to the baseline bin statistics of the continuous parameter; and
wherein the statistical test fails where the new measurement bin statistics of the continuous parameter exceeds predefined statistical limits of the baseline bin statistics; or
wherein where the selected one of the new state measurements is a discrete parameter, the discrete parameter is a central tendency parameter, the statistical testing of the central tendency parameter includes the steps of:
establishing the baseline measurements of the central tendency parameter over a measurement aggregation period (MAP), the MAP determined by a first heat;
calculating a baseline central tendency of the baseline measurements of the central tendency parameter;
calculating a dispersion parameter of the baseline measurements of the central tendency parameter;
calculating from the new measurements of the central tendency parameter a new central tendency of the central tendency parameter for a new heat; and
wherein the statistical test fails when the baseline central tendency of the new heat exceeds the baseline central tendency by a configured multiple of the dispersion parameter; or
wherein where the selected one of the new state measurements is a differential parameter, the statistical testing of the differential parameter includes the steps of:
selecting as the differential parameter to be statistically tested a differential parameter of a MAP of a one of a heat, charge, number of samples or period of time,
establishing the baseline measurements of the discrete parameter; calculating a baseline central tendency of the heat to heat difference of the baseline measurements of the discrete parameter;
calculating a baseline dispersion of the heat to heat difference of the baseline measurements of the discrete parameter;

calculating the difference between the new measurements of the discrete parameter from a new heat and the baseline measurements of the discrete parameter; and wherein the statistical test fails when the calculated difference exceeds the baseline central tendency by a configured multiple of the calculated baseline dispersion;

identify as an anomaly a failed statistical test;

classify the identified anomaly; and notify a configurable list of recipients of the classification.

35. The system of claim 34, wherein the device is a personal computer (PC).

36. The system of claim 35, the system further comprising:
at least a first electrical metering device communicably coupled to a power system of the EAF;
an EAF process and control system for monitoring and controlling the EAF;
at least a first programmable logic controllers (PLC) communicably coupled to the EAF process and control system;
wherein the PC is communicably coupled to the first electrical metering device and the PLC for at least receiving measurements therefrom.

37. The system of claim 34, wherein the device is a remote server.

38. The system of claim 37, the system further comprising:
a remote storage service configured to receive the EAF state measurements from a PC and to provide the EAF state measurements to the remote server; and
a remote data base, the remote database configured to receive from the remote server, store, and allow the remote server to access the statistical test results, the logic test results and the identified and classified anomalies.

39. An electric arc furnace (EAF), the EAF comprising:
a refractory-lined vessel covered with a retractable roof, through which one or more graphite electrodes enter the EAF;
a power system, powering the EAF;
at least a first electrical metering device communicably coupled to the power system;
an EAF process and control system measuring and controlling the EAF;
at least a first programmable logic controllers (PLC) communicably coupled to the EAF process and control system;
a computing device; the computing device communicably coupled to the first electrical metering device and the PLC; wherein the computing device is configured to:
receive and establish baseline state measurements of the EAF;
receive new state measurements of the EAF;
perform statistical testing of the baseline state measurements against the new state measurements;
wherein the new state measurements may be one of a continuous parameter, a discrete parameter, and a differential parameter;
wherein where the new state measurements is the continuous parameter the statistical testing of the continuous parameter includes the steps of:
dividing the baseline state measurements and new state measurements of the continuous parameter into baseline bins and new measurement bins according to a time base;
comparing each of the new measurement bin statistics of the continuous parameter to the baseline bin statistics of the continuous parameter; and
wherein the statistical test fails where the new measurement bin statistics of the continuous parameter exceeds predefined statistical limits of the baseline bin statistics; or
wherein where the selected one of the new state measurements is a discrete parameter, the discrete parameter is a central tendency parameter, the statistical testing of the central tendency parameter includes the steps of:
establishing the baseline measurements of the central tendency parameter over a measurement aggregation period (MAP), the MAP determined by a first heat;
calculating a baseline central tendency of the baseline measurements of the central tendency parameter;
calculating a dispersion parameter of the baseline measurements of the central tendency parameter;
calculating from the new measurements of the central tendency parameter a new central tendency of the central tendency parameter for a new heat; and
wherein the statistical test fails when the baseline central tendency of the new heat exceeds the baseline central tendency by a configured multiple of the dispersion parameter; or
wherein where the selected one of the new state measurements is a differential parameter, the statistical testing of the differential parameter includes the steps of:
selecting as the differential parameter to be statistically tested a differential parameter of a MAP of a one of a heat, charge, number of samples or period of time,
establishing the baseline measurements of the discrete parameter;
calculating a baseline central tendency of the heat to heat difference of the baseline measurements of the discrete parameter;
calculating a baseline dispersion of the heat to heat difference of the baseline measurements of the discrete parameter;
calculating the difference between the new measurements of the discrete parameter from a new heat and the baseline measurements of the discrete parameter; and
wherein the statistical test fails when the calculated difference exceeds the baseline central tendency by a configured multiple of the calculated baseline dispersion;
identify as an anomaly a failed statistical test;
classify the identified anomaly; and
send notification of the classified anomaly to a configurable list of recipients.

* * * * *